United States Patent
Starsinic et al.

(10) Patent No.: US 10,250,558 B2
(45) Date of Patent: Apr. 2, 2019

(54) METHOD AND APPARATUS FOR TRIGGERING DEVICES AND DELIVERING SMALL DATA

(71) Applicant: IOT HOLDINGS, INC., Wilmington, DE (US)

(72) Inventors: Michael F. Starsinic, Newtown, PA (US); Suresh Palanisamy, Namakkal District (IN); Behrouz Aghili, Commack, NY (US); Prashanth Murthy, Bangalore (IN); Guang Lu, Thornhill (CA); Dale N. Seed, Allentown, PA (US); Chonggang Wang, Princeton, NJ (US)

(73) Assignee: IOT Holdings, Inc., Wilmington, DE (US)

( * ) Notice: Subject to any disclaimer, the term of this patent is extended or adjusted under 35 U.S.C. 154(b) by 0 days.

(21) Appl. No.: 14/759,801

(22) PCT Filed: Jan. 6, 2014

(86) PCT No.: PCT/US2014/010351
§ 371 (c)(1),
(2) Date: Jul. 8, 2015

(87) PCT Pub. No.: WO2014/109988
PCT Pub. Date: Jul. 17, 2014

(65) Prior Publication Data
US 2016/0007390 A1 Jan. 7, 2016

Related U.S. Application Data

(60) Provisional application No. 61/750,008, filed on Jan. 8, 2013.

(51) Int. Cl.
*H04W 4/20* (2018.01)
*H04L 29/12* (2006.01)
(Continued)

(52) U.S. Cl.
CPC ........ *H04L 61/2528* (2013.01); *H04L 61/106* (2013.01); *H04L 61/6054* (2013.01);
(Continued)

(58) Field of Classification Search
CPC ..... H04W 76/021; H04W 4/005; H04W 4/20; H04L 61/2528; H04L 61/6054
(Continued)

(56) References Cited

U.S. PATENT DOCUMENTS

2012/0044897 A1 2/2012 Wager et al.
2012/0243422 A1 9/2012 Jokimies et al.
(Continued)

FOREIGN PATENT DOCUMENTS

EP 2509345 A1 10/2012
KR 10-2011-0072478 A 6/2011
(Continued)

OTHER PUBLICATIONS

3rd Generation Partnership Project; Technical Specification Group Services and System Aspects; Machine-Type and other Mobile Data Applications Communications Enhancements (Release 12) 3GPP TR 23.887 V0.6.0 (Dec. 2012).*
(Continued)

*Primary Examiner* — Faisal Choudhury
(74) *Attorney, Agent, or Firm* — Volpe and Koenig, P.C.

(57) ABSTRACT

Method and apparatus are described for delivering triggers and small data. In an embodiment, a receiver may be configured to receive a trigger or small data packet, and a transmitter may be configured to transmit a subscriber information request to see whether a subscriber is present. The receiver may be further configured to receive an identity of a second node on a condition that the subscriber is present. The transmitter may be further configured to transmit the trigger or small data packet to the second node over
(Continued)

an interface, the second node configured to create an Internet Protocol (IP) packet with an IP address containing the trigger or small data packet and deliver the IP packet to a wireless transmit/receive unit (WTRU) using the IP address and a default or dedicated bearer of the WTRU.

21 Claims, 15 Drawing Sheets

(51) Int. Cl.
    *H04W 4/00*     (2018.01)
    *H04W 80/06*     (2009.01)
    *H04W 4/02*     (2018.01)
    *H04W 4/14*     (2009.01)
    *H04W 76/00*     (2018.01)
    *H04W 4/70*     (2018.01)
    *H04W 76/11*     (2018.01)
    *H04W 4/24*     (2018.01)

(52) U.S. Cl.
    CPC ............. *H04W 4/02* (2013.01); *H04W 4/027* (2013.01); *H04W 4/14* (2013.01); *H04W 4/20* (2013.01); *H04W 4/70* (2018.02); *H04W 76/00* (2013.01); *H04W 76/11* (2018.02); *H04W 80/06* (2013.01); *H04L 61/1511* (2013.01); *H04L 61/1588* (2013.01); *H04L 61/605* (2013.01); *H04W 4/24* (2013.01)

(58) Field of Classification Search
    USPC ......................................................... 370/328
    See application file for complete search history.

(56) References Cited

U.S. PATENT DOCUMENTS

| | | | | |
|---|---|---|---|---|
| 2012/0257571 | A1* | 10/2012 | Liao | H04W 4/005 370/328 |
| 2012/0269167 | A1* | 10/2012 | Velev | H04W 36/0011 370/331 |
| 2013/0003629 | A1 | 1/2013 | Jeong et al. | |
| 2013/0017829 | A1 | 1/2013 | Kim et al. | |
| 2013/0279372 | A1* | 10/2013 | Jain | H04W 4/70 370/254 |
| 2013/0308564 | A1* | 11/2013 | Jain | H04B 15/00 370/329 |
| 2014/0050160 | A1* | 2/2014 | Ronneke | H04W 76/028 370/329 |
| 2014/0092808 | A1* | 4/2014 | Jain | H04W 52/0258 370/328 |
| 2014/0269779 | A1* | 9/2014 | Shan | H04W 28/24 370/509 |
| 2014/0286237 | A1* | 9/2014 | Bhalla | H04W 4/005 370/328 |
| 2015/0181564 | A1* | 6/2015 | Rao | H04W 4/70 370/329 |
| 2015/0208232 | A1* | 7/2015 | Liebhart | H04L 61/106 370/328 |

FOREIGN PATENT DOCUMENTS

| | | |
|---|---|---|
| KR | 10-2011-0081724 A | 7/2011 |
| KR | 10-2011-0081751 A | 7/2011 |
| WO | WO 2012/103938 A1 | 8/2012 |
| WO | WO 2013/006219 A1 | 1/2013 |
| WO | WO 2013/028026 A2 | 2/2013 |

OTHER PUBLICATIONS

3rd Generation Partnership Project (3GPP), S2-121339, "Clarifications on Device Triggering", ZTE, SA WG2 Meeting #90, Bratislava ,Slovakia, Apr. 16-20, 2012, 8 pages.

3rd Generation Partnership Project (3GPP), SP-100863, "Update to Network Improvements for Machine Type Communication", SA WG2, TSG SA Meeting #50, Istambul, Turkey, Dec. 13-15, 2010, pp. 1-4.

3rd Generation Partnership Project (3GPP), SP-110877, "Revised WID: Stage-2 Aspects of System Improvements for Machine Type Communication (SIMTC)", SA WG2, TSG SA Meeting #54, Berlin, Germany, Dec. 12-14, 2011, 7 pages.

3rd Generation Partnership Project (3GPP), TR 21.905 V11.3.0, "Technical Specification Group Services and System Aspects, Vocabulary for 3GPP Specifications (Release 11)", Dec. 2012, 64 pages.

3rd Generation Partnership Project (3GPP), TS 22.011 V11.2.0, "Technical Specification Group Services and System Aspects, Service Accessibility (Release 11)", Dec. 2011, 26 pages.

3rd Generation Partnership Project (3GPP), TS 22.368 V12.1.0, "Technical Specification Group Services and System Aspects, Service Requirements for Machine-Type Communications (MTC), Stage 1 (Release 12)", Dec. 2012, 24 pages.

3rd Generation Partnership Project (3GPP), TS 23.003 V11.4.0, "Technical Specification Group Core Network and Terminals, Numbering, Addressing and Identification (Release 11)", Dec. 2012, 83 pages.

3rd Generation Partnership Project (3GPP), TS 23.008 V11.6.0, "Technical Specification Group Core Network and Terminals, Organization of Subscriber Data (Release 11)", Dec. 2012, 109 pages.

3rd Generation Partnership Project (3GPP), TS 23.038 V11.0.0, "Technical Specification Group Core Network and Terminals, Alphabets and Language-Specific Information (Release 11)", Sep. 2012, 56 pages.

3rd Generation Partnership Project (3GPP), TS 23.039 V5.0.0, "Interface Protocols for the Connection of Short Message Service Centers (SMSCs) to Short Message Entities (SMEs)", Jun. 2002, 7 pages.

3rd Generation Partnership Project (3GPP), TS 23.040 V11.4.0, "Technical Specification Group Core Network and Terminals, Technical Realization of the Short Message Service (SMS) (Release 11)", Dec. 2012, 206 pages.

3rd Generation Partnership Project (3GPP), TS 23.060 V11.4.0, "Technical Specification Group Services and System Aspects, General Packet Radio Service (GPRS), Service Description, Stage 2 (Release 11)", Dec. 2012, 335 pages.

3rd Generation Partnership Project (3GPP), TS 23.401 V11.4.0, "Technical Specification Group Services and System Aspects, General Packet Radio Service (GPRS) Enhancements for Evolved Universal Terrestrial Radio Access Network (E-UTRAN) Access (Release 11)", Dec. 2012, 284 pages.

3rd Generation Partnership Project (3GPP), TS 23.682 V11.1.0, "Technical Specification Group Services and System Aspects, Architecture Enhancements to Facilitate Communications with Packet Data Networks and Applications (Release 11)", Jun. 2012, 27 pages.

3rd Generation Partnership Project (3GPP), TS 23.682 V11.2.0, "Technical Specification Group Services and System Aspects, Architecture Enhancements to Facilitate Communications with Packet Data Networks and Applications (Release 11)", Sep. 2012, 29 pages.

3rd Generation Partnership Project (3GPP), TS 24.007 V11.0.0, "Technical Specification Group Core Network and Terminals, Mobile Radio Interface Signalling Layer 3, General Aspects (Release 11)", Jun. 2012, 149 pages.

3rd Generation Partnership Project (3GPP), TS 24.008 V12.0.0, "Technical Specification Group Core Network and Terminals, Mobile Radio Interface Layer 3 Specification, Core Network Protocols, Stage 3 (Release 12)", Dec. 2012, 678 pages.

3rd Generation Partnership Project (3GPP), TS 24.011 V11.1.0, "Technical Specification Group Core Network and Terminals, Point-to-Point (PP) Short Message Service (SMS) Support on Mobile Radio Interface (Release 11)", Sep. 2012, 127 pages.

3rd Generation Partnership Project (3GPP), TS 24.090 V11.0.0, "Technical Specification Group Core Network and Terminals, Unstructured Supplementary Service Data (USSD), Stage 3 (Release 11)", Sep. 2012, 13 pages.

(56) References Cited

OTHER PUBLICATIONS

3rd Generation Partnership Project (3GPP), TS 24.301 V11.5.0, "Technical Specification Group Core Network and Terminals, Non-Access-Stratum (NAS) Protocol for Evolved Packet System (EPS), Stage 3 (Release 11)", Dec. 2012, 344 pages.
3rd Generation Partnership Project (3GPP), TS 29.002 V11.5.0, "Technical Specification Group Core Network and Terminals, Mobile Application Part (MAP) Specification (Release 11)", Dec. 2012, 1013 pages.
3rd Generation Partnership Project (3GPP), TS 29.272 V11.5.0, "Technical Specification Group Core Network and Terminals, Evolved Packet System (EPS), Mobility Management Entity (MME) and Serving GPRS Support Node (SGSN) Related Interfaces Based on Diameter Protocol (Release 11)", Dec. 2012, 119 pages.
3rd Generation Partnership Project (3GPP), TS 29.329 V11.5.0, "Technical Specification Group Core Network and Terminals, Sh Interface Based on the Diameter Protocol, Protocol Details (Release 11)", Dec. 2012, 22 pages.
3rd Generation Partnership Project (3GPP), TS 29.336 V1.0.0, "Home Subscriber Server (HSS) Diameter Interfaces for Interworking with Packet Data Networks and Applications", Sep. 2012, 20 pages.
3rd Generation Partnership Project (3GPP), TS 29.337 V1.0.0, "Diameter-Based T4 Interface for Communications with Packet Data Networks and Applications", Aug. 2012, 18 pages.
3rd Generation Partnership Project (3GPP), TS 29.368 V2.0.0, "Tsp Interface Protocol Between the MTC Interworking Function (MTC-IWF) and Service Capability Server (SCS)", Sep. 2012, 23 pages.
3rd Generation Partnership Project (3GPP), TS 32.240 V11.2.0, "Technical Specification Group Services and System Aspects, Telecommunication Management, Charging Management, Charging Architecture and Principles (Release 11)", Dec. 2011, 45 pages.
3rd Generation Partnership Project (3GPP), TS 32.250 V11.0.0, "Technical Specification Group Services and System Aspects, Telecommunication Management, Charging Management, Circuit Switched (CS) Domain Charging (Release 11)", Jun. 2012, 112 pages.
3rd Generation Partnership Project (3GPP), TS 32.295 V11.0.0, "Technical Specification Group Services and System Aspects, Telecommunication Management, Charging Management, Charging Data Record (CDR) Transfer (Release 11)", Sep. 2012, 32 pages.
3rd Generation Partnership Project (3GPP), TS 32.298 V11.5.0, "Technical Specification Group Services and System Aspects, Telecommunication Management, Charging Management, Charging Data Record (CDR) Parameter Description (Release 11)", Dec. 2012, 152 pages.
3rd Generation Partnership Project (3GPP), TS 32.299 V11.6.0, "Technical Specification Group Services and System Aspects, Telecommunication Management, Charging Management, Diameter Charging Applications (Release 11)", Dec. 2012, 152 pages.
3rd Generation Partnership Project (3GPP), TS 33.210 V12.2.0, "Technical Specification Group Services and System Aspects, 3G security, Network Domain Security (NDS), IP Network Layer Security (Release 12)", Dec. 2012, 24 pages.
3rd Generation Partnership Project (3GPP), TS 33.220 V11.4.0, "Technical Specification Group Services and System Aspects, Generic Authentication Architecture (GAA), Generic Bootstrapping Architecture (GBA) (Release 11)", Sep. 2012, 92 pages.
3rd Generation Partnership Project (3GPP), TS 33.310 V11.2.0, "Technical Specification Group Services and System Aspects, Network Domain Security (NDS), Authentication Framework (AF) (Release 11)", Dec. 2012, 54 pages.
Calhoun et al., "Diameter Base Protocol", Network Working Group, Request for Comments: 3588, Sep. 2003, pp. 1-147.
Crocker et al., "Augmented BNF for Syntax Specifications: ABNF", Network Working Group, Request for Comments: 2234, Category: Standards Track, Nov. 1997, pp. 1-14.
Dierks et al., "The Transport Layer Security (TLS) Protocol Version 1.1", Network Working Group, Request for Comments: 4346, Category: Standards Track, Apr. 2006, pp. 1-87.

European Telecommunications Standards Institute (ETSI), 102 690 V2.0.10, "Machine-to-Machine Communications (M2M), Functional Architecture", Sep. 2012, 25 pages.
European Telecommunications Standards Institute, ETSI TS 123 682 V11.2.0, Digital Cellular Telecommunications System (Phase 2+), Universal Mobile Telecommunications System (UMTS), LTE-Architecture Enhancements to Facilitate Communications with Packet Data Networks and Applications (3GPP TS 23.682 version11.2.0 Release 11), Nov. 2012, 31 pages.
Franks et al., "HTTP Authentication: Basic and Digest Access Authentication", Network Working Group, Request for Comments: 2617, Category: Standards Track, Jun. 1999, 30 pages.
Hakala et al., "Diameter Credit-Control Application", Network Working Group, Request for Comments: 4006, Category: Standards Track, Aug. 2005, pp. 1-114.
Niemi et al., "Hypertext Transfer Protocol (HTTP) Digest Authentication Using Authentication and Key Agreement (AKA)", Network Working Group, Request for Comments: 3310, Sep. 2002, pp. 1-18.
Romascanu et al., "Updated IANA Considerations for Diameter Command Code Allocations", Internet Engineering Task Force (IETF), Request for Comments: 5719, Category: Standards Track, Jan. 2010, pp. 1-5.
Orange et al., "WID for Small Data and Device Triggering Enhancements," 3GPP TSG SA WG2 Meeting #90, S2-122509, Bratislava, Slovakia (Apr. 16-20, 2012).
Third Generation Partnership Project, "Technical Specification Group Core Network and Terminals; Diameter-based T4 interface for communications with packet data networks and applications (Release 11)," 3GPP TS 29.337 V11.1.0 (Dec. 2012).
Third Generation Partnership Project, "Technical Specification Group Core Network and Terminals; Diameter-based T4 interface for communications with packet data networks and applications (Release 11)," 3GPP TS 29.337 V11.4.0 (Sep. 2014).
Third Generation Partnership Project, "Technical Specification Group Core Network and Terminals; Diameter-based T4 interface for communications with packet data networks and applications (Release 12)," 3GPP TS 29.337 V12.0.0 (Jun. 2013).
Third Generation Partnership Project, "Technical Specification Group Core Network and Terminals; Tsp Interface protocol between the MTC Interworking Function (MTC-IWF) and Service Capability Server (SCS) (Release 11)," 3GPP TS 29.368 V11.4.0 (Sep. 2013).
Third Generation Partnership Project, "Technical Specification Group Core Network and Terminals; Tsp Interface protocol between the MTC Interworking Function (MTC-IWF) and Service Capability Server (SCS) (Release 11)," 3GPP TS 29.368 V11.1.0 (Dec. 2012).
Third Generation Partnership Project, "Technical Specification Group Core Network and Terminals; Home Subscriber Server (HSS) diameter interfaces for interworking with packet data networks and applications (Release 11)," 3GPP TS 29.336 V11.1.0 (Dec. 2012).
Third Generation Partnership Project, "Technical Specification Group Core Network and Terminals; Home Subscriber Server (HSS) diameter interfaces for interworking with packet data networks and applications (Release 12)," 3GPP TS 29.336 V12.1.0 (Sep. 2013).
Third Generation Partnership Project, "Technical Specification Group Core Network and Terminals; Evolved Packet System (EPS); Mobility Management Entity (MME) and Serving GPRS Support Node (SGSN) related Interfaces based on Diameter protocol (Release 11)," 3GPP TS 29.272 V11.9.0 (Dec. 2013).
Third Generation Partnership Project, "Technical Specification Group Core Network and Terminals; Evolved Packet System (EPS); Mobility Management Entity (MME) and Serving GPRS Support Node (SGSN) related interfaces based on Diameter protocol (Release 12)," 3GPP TS 29.272 V12.3.0 (Dec. 2013).
Third Generation Partnership Project, "Technical Specification Group Core Network and Terminals; Vlobile Application Part (MAP) specification (Release 11)," 3GPP TS 29.002 V11.9.0 (Dec. 2013).
Third Generation Partnership Project, "Technical Specification Group Core Network and Terminals; Mobile Application Part (MAP) specification (Release 12)," 3GPP TS 29.002 V12.3.0 (Dec. 2013).

(56) References Cited

OTHER PUBLICATIONS

Third Generation Partnership Project, "Technical Specification Group Core Network and Terminals; Sh Interface based on the Diameter protocol; Protocol details (Release 12)," 3GPP TS 29.329 V12.1.0 (Jun. 2013).

Third Generation Partnership Project, "Technical Specification Group Core Network and Terminals; Sh Interface based on the Diameter protocol; Protocol details (Release 11)," 3GPP TS 29.329 V11.7.0 (Jun. 2013).

Third Generation Partnership Project, "Technical Specification Group Services and System Aspects; Machine-Type and other Mobile Data Applications Communications Enhancements (Release 12)," 3GPP TR 23.887 V0.6.0 (Dec. 2012).

Third Generation Partnership Project, "Technical Specification Group Services and System Aspects; Study on Machine-Type Communications (MTC) and other mobile data applications communications enhancements (Release 12)," 3GPP TR 23.887 V12.0.0 (Dec. 2013).

Third Generation Partnership Project, "Technical Specification Group Services and System Aspects; Architecture enhancements to facilitate communications with packet data networks and applications (Release 11)," 3GPP TS 23.682 V11.3.0 (Dec. 2012).

Third Generation Partnership Project, "Technical Specification Group Services and System Aspects; Architecture enhancements to facilitate communications with packet data networks and applications (Release 11)," 3GPP TS 23.682 V11.5.0 (Sep. 2013).

Third Generation Partnership Project, "Technical Specification Group Core Network and Terminals; Technical realization of the Short Message Service (SMS) (Release 12)," 3GPP TS 23.040 V12.0.0 (Jun. 2013).

Third Generation Partnership Project, "Technical Specification Group Core Network and Terminals; Organization of subscriber data (Release 11)," 3GPP TS 23.008 V11.9.0 (Dec. 2013).

Third Generation Partnership Project, "Technical Specification Group Core Network and Terminals; Organization of subscriber data (Release 12)," 3GPP TS 23.008 V12.1.0 (Sep. 2013).

Third Generation Partnership Project, "Technical Specification Group Services and System Aspects; General Packet Radio Service (GPRS); Service description; Stage 2 (Release 11)," 3GPP TS 23.060 V11.8.0 (Dec. 2013).

Third Generation Partnership Project, "Technical Specification Group Services and System Aspects; General Packet Radio Service (GPRS); Service description; Stage 2 (Release 12)," 3GPP TS 23.060 V12.3.0 (Dec. 2013).

Third Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.8.0 (Dec. 2013).

Third Generation Partnership Project, "Technical Specification Group Services and System Aspects; General Packet Radio Service (GPRS) enhancements for Evolved Universal Terrestrial Radio Access Network (E-UTRAN) access (Release 12)," 3GPP TS 23.401 V12.3.0 (Dec. 2013).

Third Generation Partnership Project, "Technical Specification Group Core Network and Terminals; Numbering, addressing and identification (Release 11)," 3GPP TS 23.003 V11.7.0 (Dec. 2013).

Third Generation Partnership Project, "Technical Specification Group Core Network and Terminals; Numbering, addressing and identification (Release 12)," 3GPP TS 23.003 V12.1.0 (Dec. 2013).

Third Generation Partnership Project, "Technical Specification Group Core Network and Terminals; Technical realization of the Short Message Service (SMS) (Release 12)," 3GPP TS 23.040 V12.2.0 (Dec. 2013).

Third Generation Partnership Project, "Technical Specification Group Services and System Aspects; Vocabulary for 3GPP Specifications (Release 12)," 3GPP TR 21.905 V12.0.0 (Jun. 2013).

Third Generation Partnership Project, "Technical Specification Group Core Network and Terminals; Mobile radio interface signalling layer 3; General aspects (Release 12)," 3GPP TS 24.007 V12.0.0 (Jun. 2013).

Third Generation Partnership Project, "Technical Specification Group Core Network and Terminals; Mobile radio interface Layer 3 specification; Core network protocols; Stage 3 (Release 12)," 3GPP TS 24.008 V12.4.0 (Dec. 2013).

Third Generation Partnership Project, "Technical Specification Group Services and System Aspects; Telecommunication management; Charging management; Charging Data Record (CDR) transfer (Release 12)," 3GPP TS 32.295 V12.0.0 (Sep. 2013).

Third Generation Partnership Project, "Technical Specification Group Services and System Aspects; Telecommunication management; Charging management; Charging architecture and principles (Release 12)," 3GPP TS 32.240 V12.3.0 (Dec. 2013).

Third Generation Partnership Project, "Technical Specification Group Services and System Aspects; Telecommunication management; Charging management; Charging architecture and principles (Release 11)," 3GPP TS 32.240 V11.5.0 (Sep. 2012).

Third Generation Partnership Project, "Technical Specification Group Services and System Aspects; Telecommunication management; Charging management; Charging architecture and principles (Release 11)," 3GPP TS 32.240 V11.6.0 (Mar. 2013).

Third Generation Partnership Project, "Technical Specification Group Services and System Aspects; Generic Authentication Architecture (GAA); Generic Bootstrapping Architecture (GBA) (Release 11)," 3GPP TS 33.220 V11.5.0 (Jun. 2013).

Third Generation Partnership Project, "Technical Specification Group Services and System Aspects; Generic Authentication Architecture (GAA); Generic Bootstrapping Architecture (GBA) (Release 12)," 3GPP TS 33.220 V12.2.0 (Dec. 2013).

Third Generation Partnership Project, "Technical Specification Group Services and System Aspects; Network Domain Security (NDS); Authentication Framework (AF) (Release 12)," 3GPP TS 33.310 V12.0.0 (Jun. 2013).

Third Generation Partnership Project, "Technical Specification Group Services and System Aspects; Telecommunication management; Charging management; Charging Data Record (CDR) parameter description Release 12)," 3GPP TS 32.298 V12.2.0 (Dec. 2013).

Third Generation Partnership Project, "Technical Specification Group Services and System Aspects; Telecommunication management; Charging management; Charging Data Record (CDR) parameter description (Release 11)," 3GPP TS 32.298 V11.8.0 (Dec. 2013).

Third Generation Partnership Project, "Technical Specification Group Services and System Aspects; Telecommunication management; Charging management; Diameter charging applications (Release 12)," 3GPP TS 32.299 V12.3.0 (Dec. 2013).

Third Generation Partnership Project, "Technical Specification Group Services and System Aspects; Telecommunication management; Charging management; Diameter charging applications (Release 11)," 3GPP TS 32.299 V11.10.0 (Dec. 2013).

Third Generation Partnership Project, "Technical Specification Group Services and System Aspects; Telecommunication management; Charging management; Circuit Switched (CS) domain charging (Release 11)," 3GPP TS 32.250 V11.1.0 (Mar. 2013).

Third Generation Partnership Project, "Technical Specification Group Services and System Aspects; Service accessibility (Release 12)," 3GPP TS 22.011 V12.0.0 (Mar. 2013).

Third Generation Partnership Project, "Technical Specification Group Services and System Aspects; Service accessibility (Release 11)," 3GPP TS 22.011 V11.3.0 (Mar. 2013).

Third Generation Partnership Project, "Technical Specification Group Services and System Aspects; Service requirements for Machine-Type Communications (MTC); Stage 1 (Release 12)," 3GPP TS 22.368 V12.3.0 (Dec. 2013).

Third Generation Partnership Project, "Technical Specification Group Core Network and Terminals; Non-Access-Stratum (NAS) protocol for Evolved Packet System (EPS); Stage 3 (Release 12)," 3GPP TS 24.301 V12.3.0 (Dec. 2013).

(56) References Cited

OTHER PUBLICATIONS

Third Generation Partnership Project, "Technical Specification Group Core Network and Terminals; Non-Access-Stratum (NAS) protocol for Evolved Packet System (EPS); Stage 3 (Release 11)," 3GPP TS 24.301 V11.9.0 (Dec. 2013).

Third Generation Partnership Project, "Technical Specification Group Services and System Aspects; Architecture enhancements to facilitate communications with packet data networks and applications (Release 12)," 3GPP TS 23.682 V12.0.0 (Dec. 2013).

Sierra Wireless et al., "Update to MTC Device Trigger Gateway solution," 3GPP TSG SA WG2 Meeting #84, S2-112299, Bratislava, Slovakia (Apr. 11-15, 2011).

* cited by examiner

| IEI | INFORMATION ELEMENT | TYPE/REFERENCE | PRESENCE | FORMAT | LENGTH |
|---|---|---|---|---|---|
| | PROTOCOL DISCRIMINATOR | PROTOCOL DISCRIMINATOR | M | V | 1/2 |
| | SECURITY HEADER TYPE | SECURITY HEADER TYPE | M | V | 1/2 |
| | DOWNLINK GENERIC NAS TRANSPORT MESSAGE IDENTITY | MESSAGE TYPE | M | V | 1 |
| | GENERIC MESSAGE CONTAINER TYPE | GENERIC MESSAGE CONTAINER TYPE | M | V | 1 |
| | GENERIC MESSAGE CONTAINER | GENERIC MESSAGE CONTAINER | M | LV-E | 3-n |
| 65 | ADDITIONAL INFORMATION | ADDITIONAL INFORMATION | O | TLV | 3-n |
| TBD | MTC REFERENCE NUMBER | MTC REFERENCE NUMBER | O | TLV | 2 |

FIG. 11

| IEI | INFORMATION ELEMENT | TYPE/REFERENCE | PRESENCE | FORMAT | LENGTH |
|---|---|---|---|---|---|
| | PROTOCOL DISCRIMINATOR | PROTOCOL DISCRIMINATOR | M | V | 1/2 |
| | SECURITY HEADER TYPE | SECURITY HEADER TYPE | M | V | 1/2 |
| | UPLINK GENERIC NAS TRANSPORT MESSAGE IDENTITY | MESSAGE TYPE | M | V | 1 |
| | GENERIC MESSAGE CONTAINER TYPE | GENERIC MESSAGE CONTAINER TYPE | M | V | 1 |
| | GENERIC MESSAGE CONTAINER | GENERIC MESSAGE CONTAINER | M | LV-E | 3-n |
| 65 | ADDITIONAL INFORMATION | ADDITIONAL INFORMATION | O | TLV | 3-n |
| TBD | MTC REFERENCE NUMBER | MTC REFERENCE NUMBER | O | TLV | 2 |

FIG. 12

```
BITS
8 7 6 5 4 3 2 1
0 0 0 0 0 0 0 0      RESERVED
0 0 0 0 0 0 0 1      LTE POSITIONING PROTOCOL (LPP) MESSAGE CONTAINER
0 0 0 0 0 0 1 0      LOCATION SERVICES MESSAGE CONTAINER
0 0 0 0 0 0 1 1      MTC TRIGGER OR SMALL DATA
0 0 0 0 0 1 0 0
      TO             UNUSED
0 1 1 1 1 1 1 1
1 0 0 0 0 0 0 0
      TO             RESERVED
1 1 1 1 1 1 1 1
```
FIG. 13
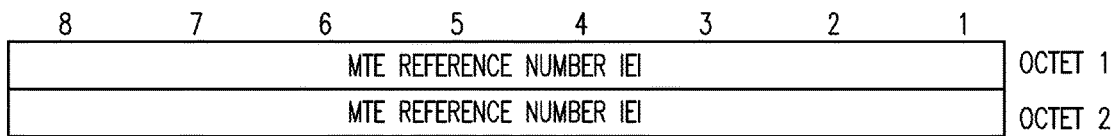
FIG. 14
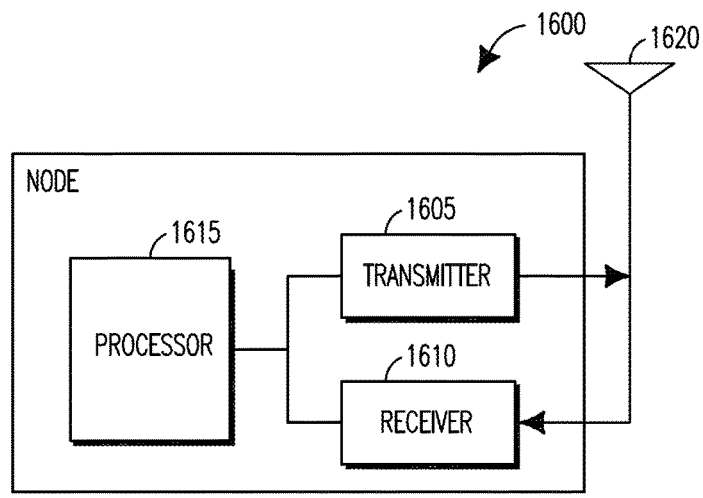
FIG. 15

METHOD AND APPARATUS FOR TRIGGERING DEVICES AND DELIVERING SMALL DATA

CROSS REFERENCE TO RELATED APPLICATION

This application is the National Stage Entry under 35 U.S.C. § 371 of Patent Cooperation Treaty Application No. PCT/US2014/010351, filed Jan. 6, 2014, which claims the benefit of U.S. Provisional Application Ser. No. 61/750,008 filed Jan. 8, 2013, the contents of which are incorporated herein by reference in their entirety.

BACKGROUND

Machine type communication (MTC) data flow may be characterized by the exchange of small data. A services capability server (SCS) may be required to trigger a device to perform some action. When a device receives a trigger, it may respond with a small data packet from the application. An application-specific packet may be sent to the SCS over a control plane by the device. The trigger may be provided to the SCS in a trigger report. Such a feature may avoid the need for more activity on a data plane.

The SCS may be assigned a trigger quota. The SCS may be restricted from exceeding a given number of trigger submissions per unit of time. The quota may be SCS-specific (subscription based). However, a mechanism for enforcing and/or maintaining the quota is not currently available. A home subscriber server (HSS) may maintain the quota. When an MTC interworking function (MTC-IWF) authorizes a trigger request, the HSS may check the trigger quota and decrement it accordingly. However, the HSS may have to be queried before every trigger request, and the MTC-IWF may not be able to avoid HSS queries by caching subscriber data. Thus, the MTC-IWF may have to authorize every trigger with the HSS.

SUMMARY

A method and apparatus are described for delivering triggers and small data. In the apparatus a receiver is configured to receive a trigger or small data packet, and a transmitter is configured to transmit a subscriber information request to see whether a subscriber is present. The receiver may be further configured to receive an identity of a second node on a condition that the subscriber is present. The transmitter may be further configured to transmit the trigger or small data packet to the second node over a $T_{xx}$ interface, the second node configured to create an Internet Protocol (IP) packet with an IP address containing the trigger or small data packet and deliver the IP packet to a wireless transmit/receive unit (WTRU) using the IP address and a default or dedicated bearer of the WTRU. In another embodiment, the apparatus may include a receiver configured to receive a trigger or small data packet, a processor configured to create a downlink generic non-access stratum (NAS) transport message with contents of the trigger or small data packet, and a transmitter configured to transmit the NAS transport message to a wireless transmit/receive unit (WTRU). In a third embodiment, the receiver, transmitter, and processor may be configured to use an online charging system to check if at least one of a services capability server or a device has exceeded a trigger submission quota.

BRIEF DESCRIPTION OF THE DRAWINGS

A more detailed understanding may be had from the following description, given by way of example in conjunction with the accompanying drawings wherein:

FIG. 11 shows an example of downlink generic non-access stratum (NAS) transport message content;

FIG. 12 shows an example of uplink generic NAS transport message content;

FIG. 13 shows an example of a generic message container type information element;

FIG. 14 shows an example of an MTC reference number information element; and

FIG. 15 shows an example of a node in a packet data network.

DETAILED DESCRIPTION

Figure 1A:
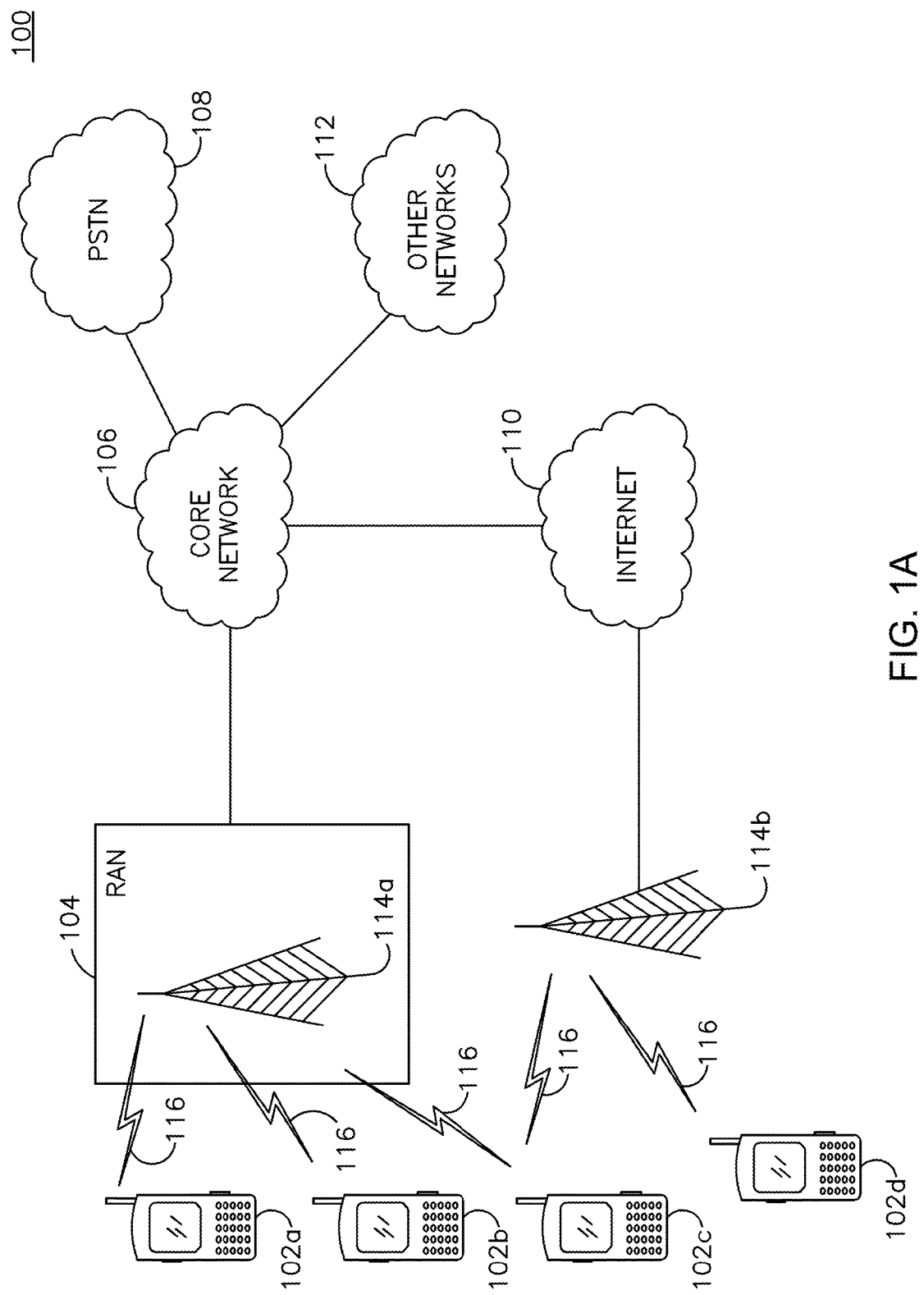
FIG. 1A shows an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102*d* may be any type of device configured to operate and/or communicate in a wireless environment. By way of example, the WTRUs 102*a*, 102*b*, 102*c*, 102*d* may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114*a* and a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the core network 106, the Internet 110, and/or the other networks 112. By way of example, the base stations 114*a*, 114*b* may be a base transceiver station (BTS), a Node-B, an evolved Node-B (eNB), a Home Node-B (HNB), a Home eNB (HeNB), a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals within a particular geographic region, which may be referred to as a cell (not shown). The cell may further be divided into cell sectors. For example, the cell associated with the base station 114*a* may be divided into three sectors. Thus, in one embodiment, the base station 114*a* may include three transceivers, i.e., one for each sector of the cell. In another embodiment, the base station 114*a* may employ multiple-input multiple-output (MIMO) technology and, therefore, may utilize multiple transceivers for each sector of the cell.

The base stations 114*a*, 114*b* may communicate with one or more of the WTRUs 102*a*, 102*b*, 102*c*, 102*d* over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 114*a* and the WTRUs 102*a*, 102*b*, 102*c* may implement a radio technology such as evolved UTRA (E-UTRA), which may establish the air interface 116 using long term evolution (LTE) and/or LTE-Advanced (LTE-A).

In other embodiments, the base station 114*a* and the WTRUs 102*a*, 102*b*, 102*c* may implement radio technologies such as IEEE 802.16 (i.e., worldwide interoperability for microwave access (WiMAX)), CDMA2000, CDMA2000 1×, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114*b* in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT, (e.g., WCDMA, CDMA2000, GSM, LTE, LTE-A, and the like), to establish a picocell or femtocell. As shown in FIG. 1A, the base station 114*b* may have a direct connection to the Internet 110. Thus, the base station 114*b* may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102*a*, 102*b*, 102*c*, 102*d*. For example, the core network 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114b, which may employ an IEEE 802 radio technology.

Figure 1B:
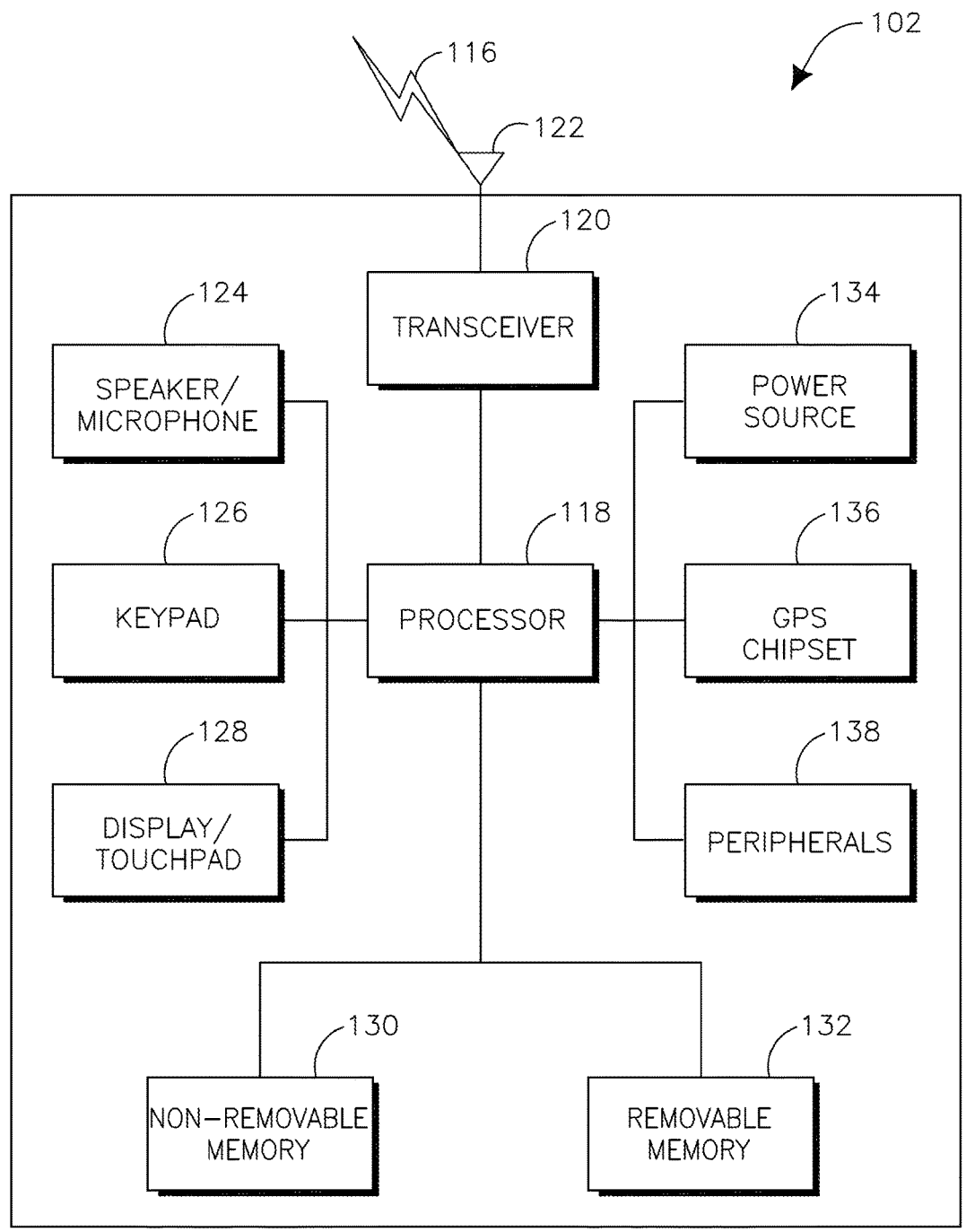
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
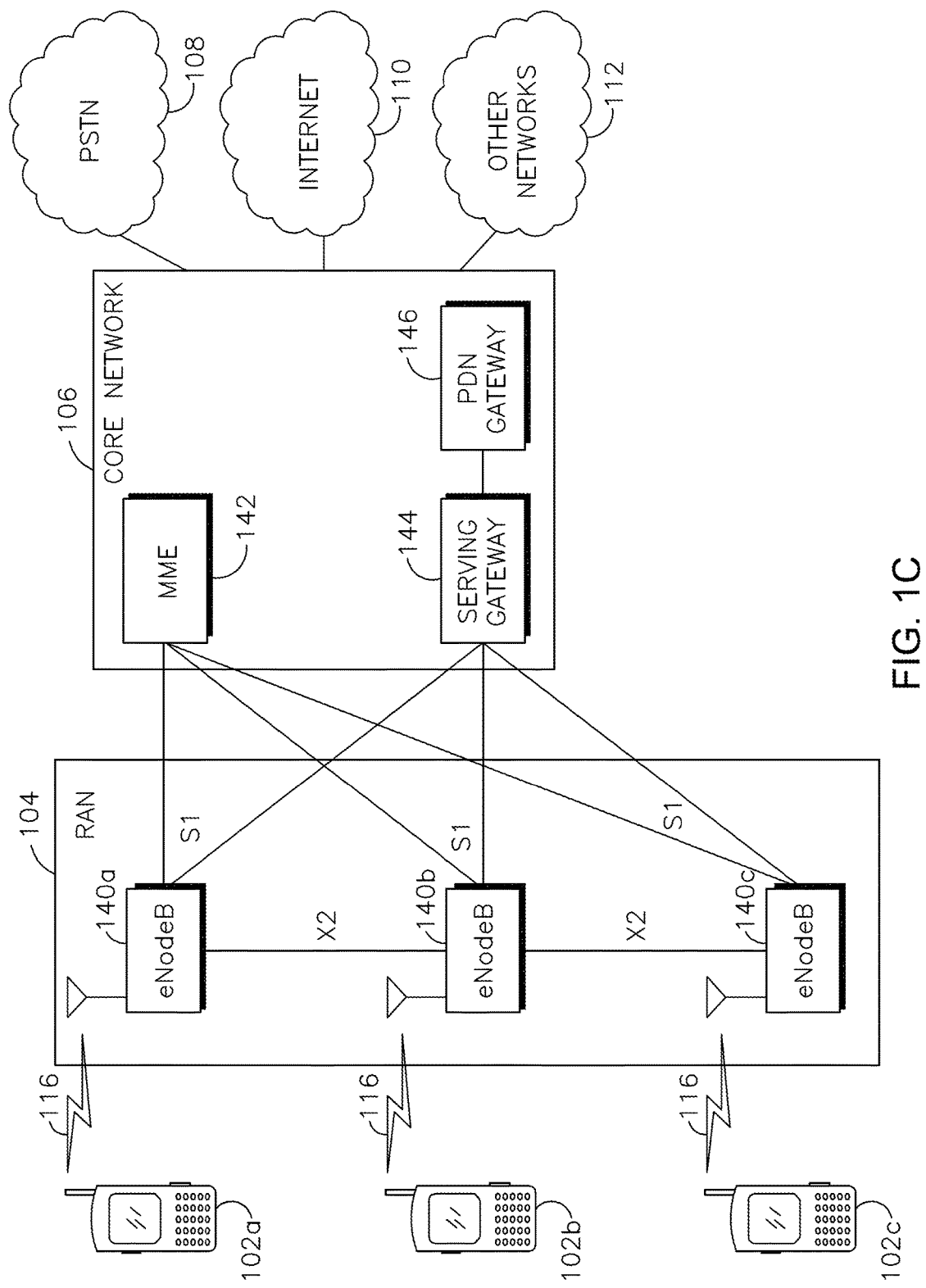
FIG. 1C shows an example radio access network and an example core network that may be used within the communications system shown in FIG. 1A.

FIG. 1C shows an example RAN 104 and an example core network 106 that may be used within the communications system 100 shown in FIG. 1A. As noted above, the RAN 104 may employ an E-UTRA radio technology to communicate with the WTRUs 102a, 102b, 102c over the air interface 116. The RAN 104 may also be in communication with the core network 106.

The RAN 104 may include eNBs 140a, 140b, 140c, though it will be appreciated that the RAN 104 may include any number of eNBs while remaining consistent with an embodiment. The eNBs 140a, 140b, 140c may each include one or more transceivers for communicating with the WTRUs 102a, 102b, 102c over the air interface 116. In one embodiment, the eNBs 140a, 140b, 140c may implement MIMO technology. Thus, the eNB 140a, for example, may use multiple antennas to transmit wireless signals to, and receive wireless signals from, the WTRU 102a.

Each of the eNBs 140a, 140b, 140c may be associated with a particular cell (not shown) and may be configured to handle radio resource management decisions, handover decisions, scheduling of users in the uplink and/or downlink, and the like. As shown in FIG. 1C, the eNBs 140a, 140b, 140c may communicate with one another over an X2 interface.

The core network 106 shown in FIG. 1C may include a mobility management entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNBs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNB handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway, (e.g., an IP multimedia subsystem (IMS) server), that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Machine type communication (MTC) small data and device triggering enhancements and an online charging system (OCS)/trigger quota are described herein. These may solve a problem that may arise in MTC interworking function (IWF) implementations as the number of MTC devices or WTRUs increases.

Long term evolution (LTE) devices may have an Internet protocol (IP) address. There may not be a need to modify existing WTRUs so that they can receive triggers over the control plane. A procedure is desired to deliver a trigger to an LTE device over a user plane.

Triggers may be delivered from a mobility management entity (MME) to a WTRU over a control plane. A method is desired that is backwards compatible with existing WTRUs.

Small data may be delivered to/from the MME and WTRU over the control plane. A method is desired that is backwards compatible with existing WTRUs.

Triggers may be delivered from the MSC to the WTRU over the control plane. A method is desired that is backwards compatible with existing WTRUs.

Small data may be delivered to/from the MSC and WTRU over the control plane. A method is desired that is backwards compatible with existing WTRUs.

A new triggering method is described herein that includes adding an interface ($T_{xx}$) between the MTC-IWF and packet data network (PDN) gateway (P-GW) to enable triggers to be sent over the user plane.

A mechanism is described herein for delivering device triggers from the MME to the WTRU, and for delivering small data to/from the MME and the WTRU. The existing non-access stratum (NAS) messages may be modified in a backwards compatible manner to support triggering and small data delivery.

A mechanism is described herein for delivering device triggers from the MSC to the WTRU, and for delivering small data to/from the MSC and the WTRU. The existing unstructured supplementary service data (USSD) messages may be modified in a backwards compatible manner to support triggering and small data delivery.

When T5 or $T_{xx}$ triggering is used, the WTRU application may respond with some application specific information. The application specific response may be transparent to the core network (CN) and may be delivered to the SCS as part of the trigger report.

An interface may be added between an MTC-IWF and an online charging system (OCS). The OCS may be used by the MTC-IWF to keep track of the trigger quota of devices and SCSs. By using the OCS to keep track of the trigger quotas and caching subscriber information in the MTC-IWF, HSS queries may be reduced. When trigger requests are rejected due to quota limitations, the MTC-IWF may respond with an estimate or indication of when the quota may be refreshed.

Figure 2:
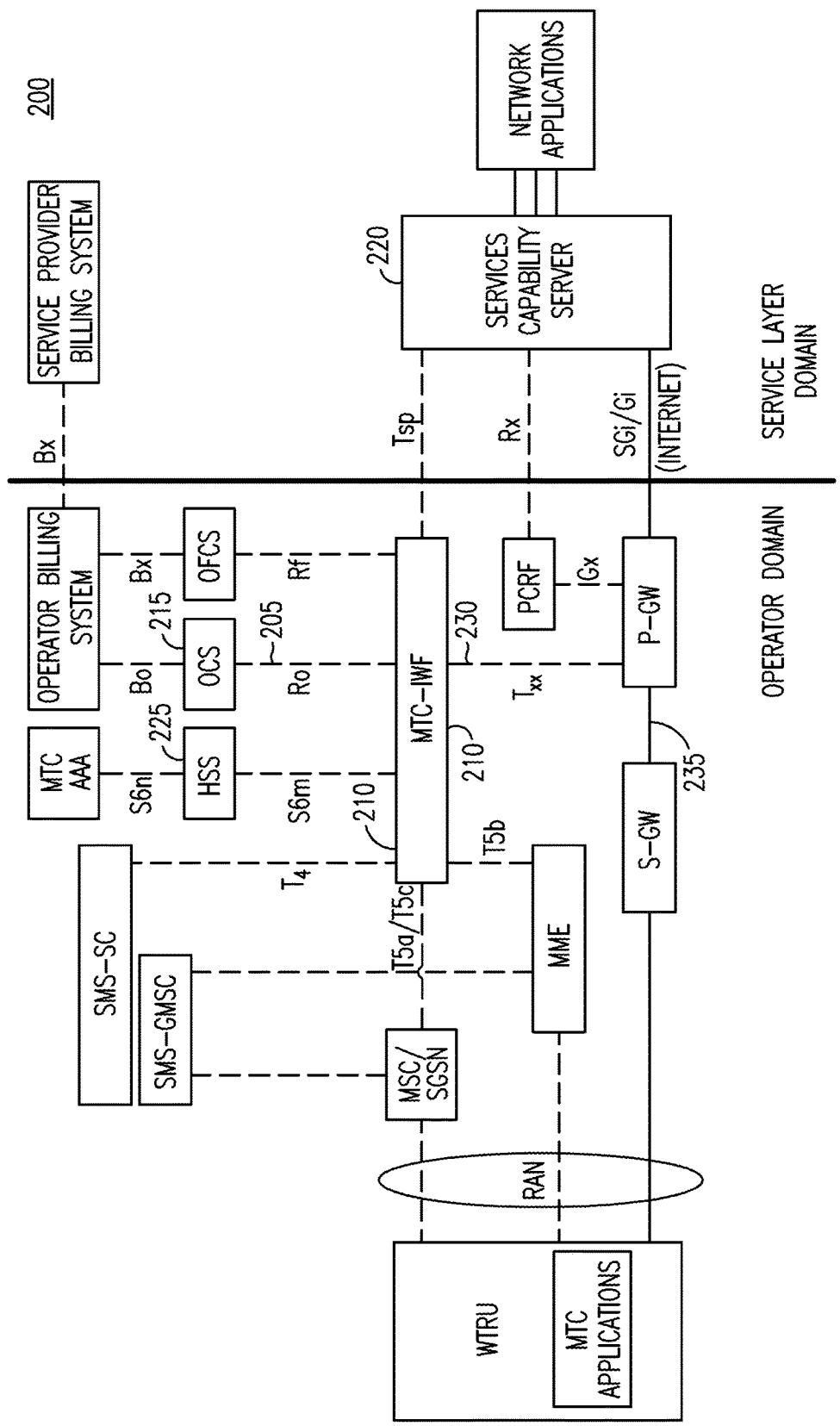
FIG. 2 shows an example of a third generation partnership project (3GPP) core network/service layer machine type communication (MTC) architecture.

FIG. 2 shows an example of a modification of the third generation partnership project (3GPP) core network/service layer MTC architecture 200. The MTC architecture 200 may include an Ro interface 205 between an MTC interworking function (MTC-IWF) 210 and an OCS 215. Ro is an existing diameter protocol that may be used to interface to the OCS 215.

The OCS 215 may be used to keep track of a trigger quota for each SCS 220 and/or each device. Each time the MTC-IWF 210 receives a trigger request from the SCS 220, it may use the OCS 215 to check if the trigger quota for the SCS 220 and/or device has been exceeded.

A home subscriber server (HSS) 225 may keep track of each SCS 220 and/or device's trigger quota. When the MTC-IWF 210 fetches subscriber data, the HSS 225 may verify that the trigger quota(s) has not been exceeded. If the MTC-IWF 210 fetches subscriber data after every SCS trigger request, then the HSS-based approach is sufficient. However, in order to decrease HSS accesses, the MTC-IWF 210 may choose to cache subscriber data. If the MTC-IWF 210 chooses to do this, the Ro interface 205 to the OCS 215 may be used to check that no trigger quotas have been exceeded.

Device triggers may be used to transmit small amounts of MTC device application data from an SCS to an MTC WTRU. For example, an SCS may use a device trigger to instruct a sensor to turn on. If the SCS expects no response, then no IP connection may be required.

Device triggers may instruct an MTC device application to initiate communication with an SCS, thus requiring the MTC WTRU to obtain an IP address if it does not already have one. If an SCS wishes to address an MTC device application that does not have an IP address, a device trigger may be required.

The possibility of delivering a trigger to an MTC device application that already has an IP address may not be precluded. An SCS may desire to establish a connection with an MTC device application. However, the SCS may not know the device's IP address or the SCS may be unsure if the MTC device has an IP address. The MTC-IWF may deliver the trigger to the device in this scenario. An alternative approach may be for the MTC-IWF to reply to the trigger request with an indication that the device already an IP address and to provide the IP address.

Device triggering may be supported in release 11 (R11) of the 3GPP standard via a T4 reference point and using short message service (SMS) as the trigger transport method.

Device triggering may include T4 triggering, T5 triggering and $T_{xx}$ triggering. T4 triggering is included in R11 of the 3GPP standard. In T4 triggering, the trigger is delivered to the WTRU via SMS. T5 Triggering is not included in R11 of the 3GPP standard. In R11, the T5 interface between the serving node and MTC-IWF is mentioned, but only minimal details are included. In T5 triggering, the trigger may be delivered from the MTC-IWF to the serving node. The serving node may forward the trigger to the WTRU.

$T_{xx}$ triggering is a new trigger delivery method. In $T_{xx}$ triggering, the MTC-IWF may deliver the trigger to a P-GW via the $T_{xx}$ interface 230. The P-GW may create an IP packet with the trigger contents and use the WTRU's default bearer or a dedicated bearer to deliver the packet to a serving gateway (S-GW). If the device is in the idle state, the S-GW and MME may activate the default bearers and deliver the trigger to the WTRU. The trigger delivery method may be selected by the MTC-IWF per operator polices and the delivery method may be transparent to the SCS.

Figure 3:
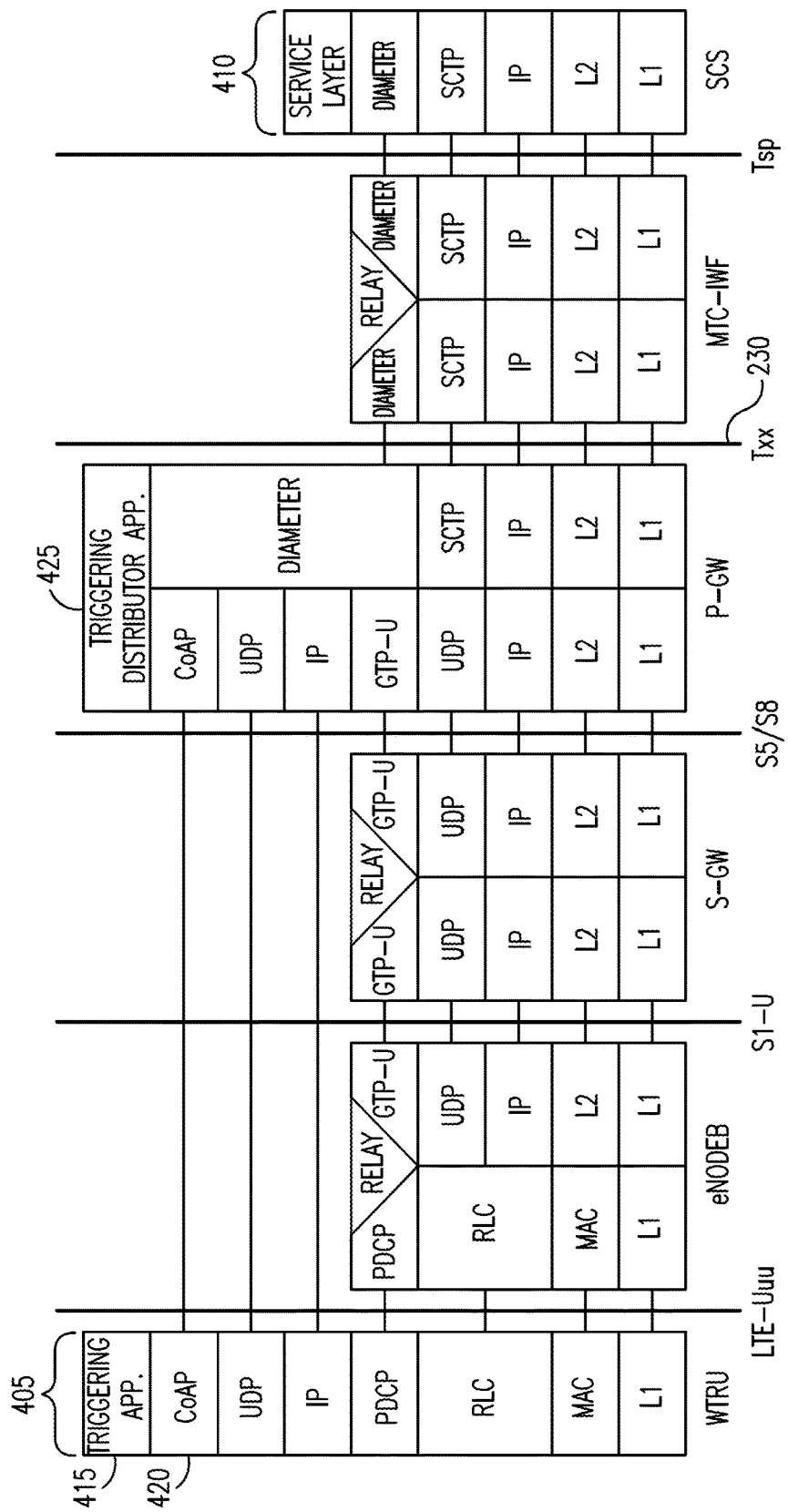
FIG. 3 shows an example of a trigger/small data protocol stack.

FIG. 3 shows the protocol stack for the $T_{xx}$ interface 230 and how the trigger request travels from the SCS 410 down to the Triggering Application 415. Changes to the WTRU protocol stack are not necessary. The Triggering Application 415 may use the constrained application protocol (CoAP) application 420 to communicate with the Triggering Distributor Application 425 and may listen on the port number that is specified by the SCS 410 in the trigger request.

Figure 4:
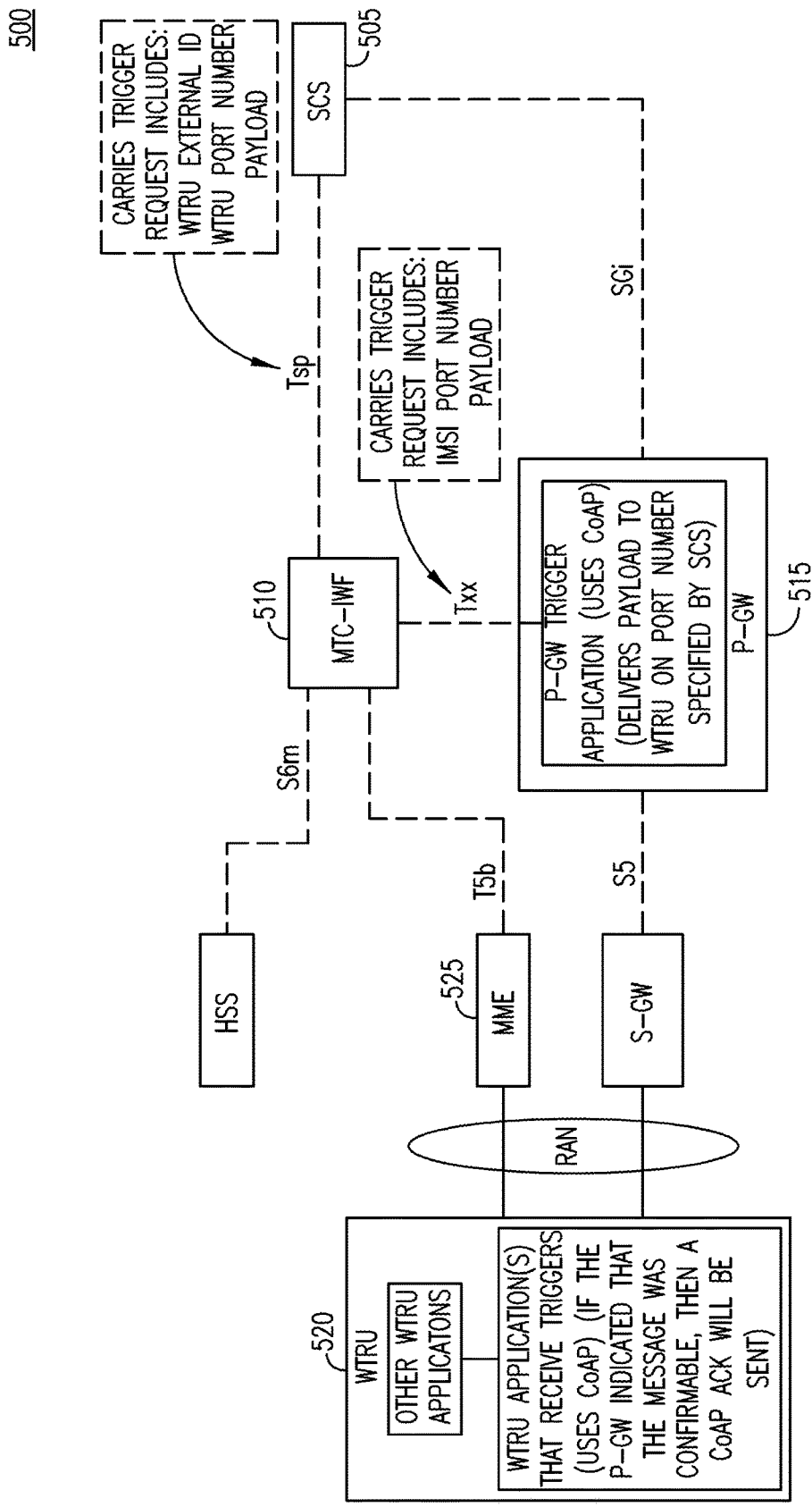
FIG. 4 shows an example of trigger delivery.

FIG. 4 shows an example of an architecture 500 for supporting $T_{xx}$ trigger delivery including an SCS 505, an MTC-IWF 510, a P-GW 515, a WTRU 520 and an MME 525. When the SCS 505 makes the trigger request, it may provide the MTC-IWF 510 with the following parameters: the WTRU external identification (ID), the port number for the application that may receive the trigger, and the trigger payload. The trigger payload may be transparent to the core network.

The MTC-IWF 510 may determine the P-GW 515 of the WTRU 520 by querying the MME 525 and forwarding the trigger request to the P-GW 515. When the request is sent to the P-GW 515, the WTRU 520 may be identified by international mobile subscriber identity (IMSI). The P-GW 515 may accept the trigger request from the MTC-IWF 510 and forward it to a trigger distributor application. The P-GW 515 may resolve the IMSI to an IP address. The trigger distributor application may be CoAP-based and it may transmit the trigger payload to the IP address of the WTRU 520 and the port number that was specified in the trigger request. The IP address of the P-GW 515 may be used to transmit this message. The CoAP message may be confirmable. Thus, the WTRU trigger application may transmit a CoAP positive acknowledgement (ACK) acknowledging that the packet was delivered. The CoAP ACK may include application specific data. This application specific data may be transparent to the P-GW 515 and the MTC-IWF 510.

In accordance with operator polices, the CoAP message may be re-sent after a configurable time-out, and delivery attempts may be stopped after a configurable number of attempts. The P-GW 515 may address the trigger or small data message to a well known resource name on the WTRU 520 that is used for receiving triggers and/or small data messages. If the WTRU 520 is a gateway, the P-GW 515 may use the uniform resource identifier (URI) proxy field of the CoAP message to indicate that the gateway may proxy for a device that is behind the gateway. Alternatively, the P-GW 515 may include resources for storing WTRU triggers, and the WTRU applications may subscribe to those resources. For example, the P-GW 515 may serve as a CoAP server. A special resource may be used for to device triggering purposes. The WTRU 520 may subscribe to the resources on the P-GW 515. When there is a device triggering request from the MTC-IWF 510 to the P-GW 515, the resources on the P-GW may be changed. As a result, the WTRU 520 may automatically receive the CoAP notification. This approach may increase P-GW complexity but slightly mitigate complexity on the WTRU side.

The WTRU 520 may have an application listening for a CoAP message on the port that was specified by the SCS 505. Since the P-GW 515 may transmit the CoAP message as confirmable, the WTRU 520 may respond with a CoAP ACK. The CoAP ACK may include application specific data. This application specific data may be transparent to the P-GW 515 and the MTC-IWF 510. The WTRU application that receives the trigger may be the intended application, or it may be a dispatch application that will forward the payload to another application. The other application may be identified in the trigger payload. Application protocols other than CoAP may be used, such as hypertext transfer protocol (HTTP), IBM's message queue telemetry transport (MQTT), Internet Engineering Task Force's (IETF) extensible messaging and presence protocol (XMPP) and simple object access protocol (SOAP).

If the WTRU application supports CoAP, the trigger can be transmitted directly to the application. Optionally, the WTRU could have a trigger dispatch function that accepts triggers and forwards the payload to the application.

Figure 5:
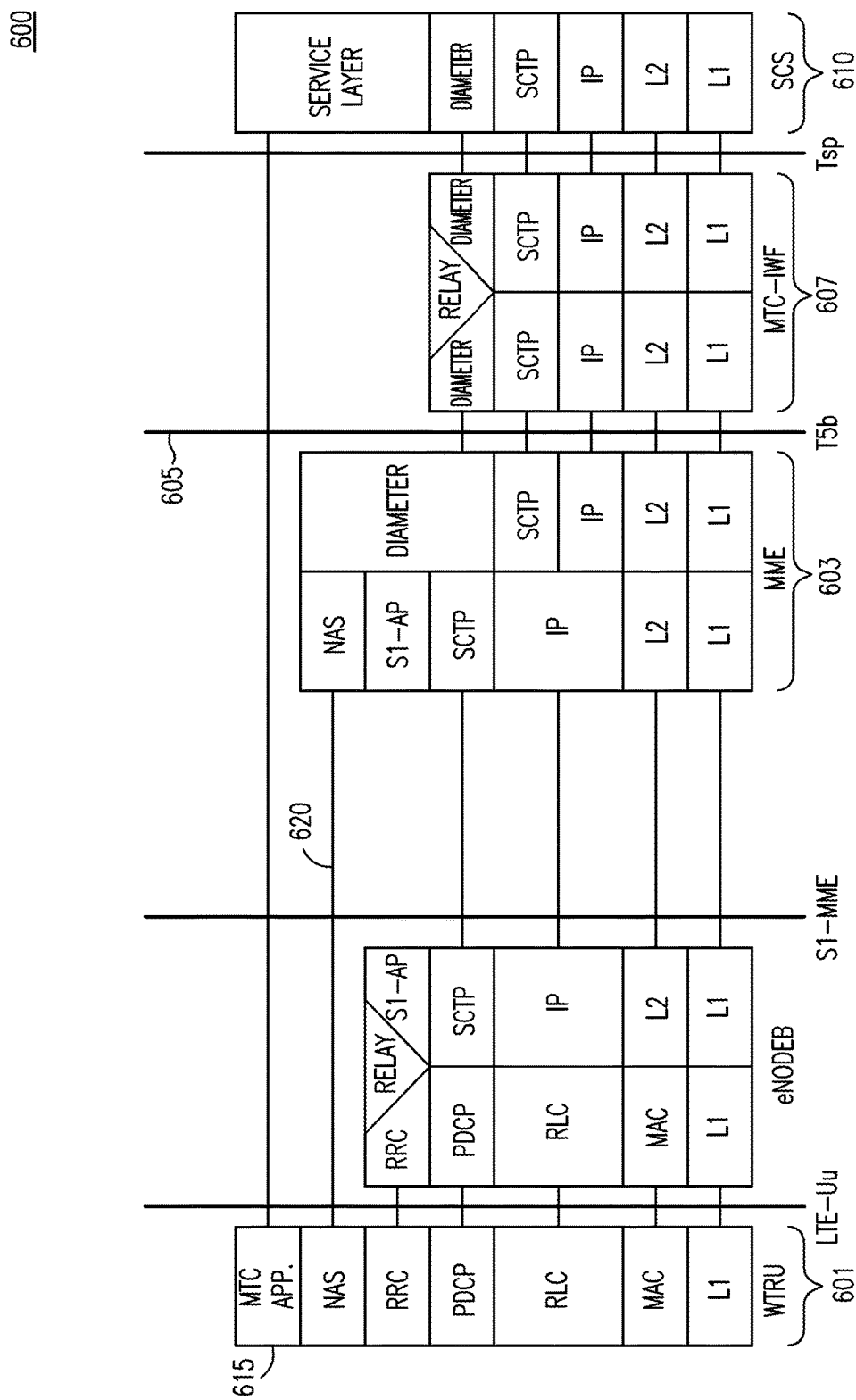
FIG. 5 shows an example of a trigger/small data protocol stack.

FIG. 5 shows an example of a protocol stack 600 for the T5b interface 605 and how triggers and small data travel from the SCS 610 down to the MTC application 615. When the MTC-IWF 607 selects the T5b trigger delivery method, the diameter interface between the MME 603 and the MTC-IWF 607 may be used to deliver the trigger from the MTC-IWF 607 to the MME 603.

A NAS message 620 may be used to carry the trigger from the MME to the WTRU's dispatch function. A generic transport of NAS message procedure uses a DOWNLINK GENERIC NAS TRANSPORT message to carry the message from the MME 603 to the WTRU 601. When the WTRU 601 receives the message, it may provide the contents of the generic message container information element (IE) and the generic message container type IE to the evolved packet system (EPS) mobility management (EMM) entity in the WTRU. When this method is used to deliver small data or triggers to the WTRU, the fields of the DOWNLINK GENERIC NAS TRANSPORT message may be set as follows. The "generic message container type" information element may be set to MTC trigger or small data to provide a new encoding. The EMM entity in the WTRU may use this field to recognize that the message is a trigger or small data that needs to be delivered to the MTC dispatch function. The "additional information" IE may be set to the application identifier (4 byte port number) of the application that may receive the payload. The MTC dispatch function may use this value to determine which application should receive the payload. The trigger payload or small data payload may be delivered in the "generic message container" IE. The contents of this container may be delivered to the MTC application 615. A NAS message 620 may be used to carry the trigger report from the WTRU's dispatch function to the MME. The UPLINK GENERIC NAS TRANSPORT message may be used to carry the message from the WTRU 601 to the MME 603. When the MME 603 receives the message, it may provide a trigger report to the MTC-IWF 607.

When this method is used to deliver small data or trigger reports from the WTRU 601, the fields of the UPLINK GENERIC NAS TRANSPORT message may be set as follows. The "generic message container type" IE may be set to MTC trigger or small data. The EMM entity in the WTRU may use this field to indicate that the message is response to a trigger or is a small data packet that was delivered to the MTC dispatch function. The "additional information" IE may be set to the application identifier (4 byte port number) of the application that is responding to the trigger or transmitting the small data packet. The application may provide an application-specific response to the MTC dispatch function. If it does provide such a response, the MTC dispatch function may include the response in a "generic message container" IE. The contents of this container may be delivered to the MME 603. The MME 603 may forward the response to the MTC-IWF 607.

The T5c trigger and downlink small data delivery are described below. The T5c delivery method may use unstructured supplementary service data (USSD) operations of the UMTS network. USSD services may originate from the global system for mobile communications (GSM) service control function (SCF) or home location register (HLR) in the network, and at the WTRU. This method may introduce an USSD application in the MTC-IWF. USSD operations may be controlled by the supplementary services (SS), (i.e., call independent SS (CISS)), sublayer of the NAS layer in the MSC protocol stack. The SS sublayer may use the services of the mobility management (MM) sublayer to complete the USSD procedures. Between the visitor location register (VLR) and HLR, and HLR and GSM SCF, USSD procedures may be carried out on the mobile application part (MAP) protocol.

Figure 6:
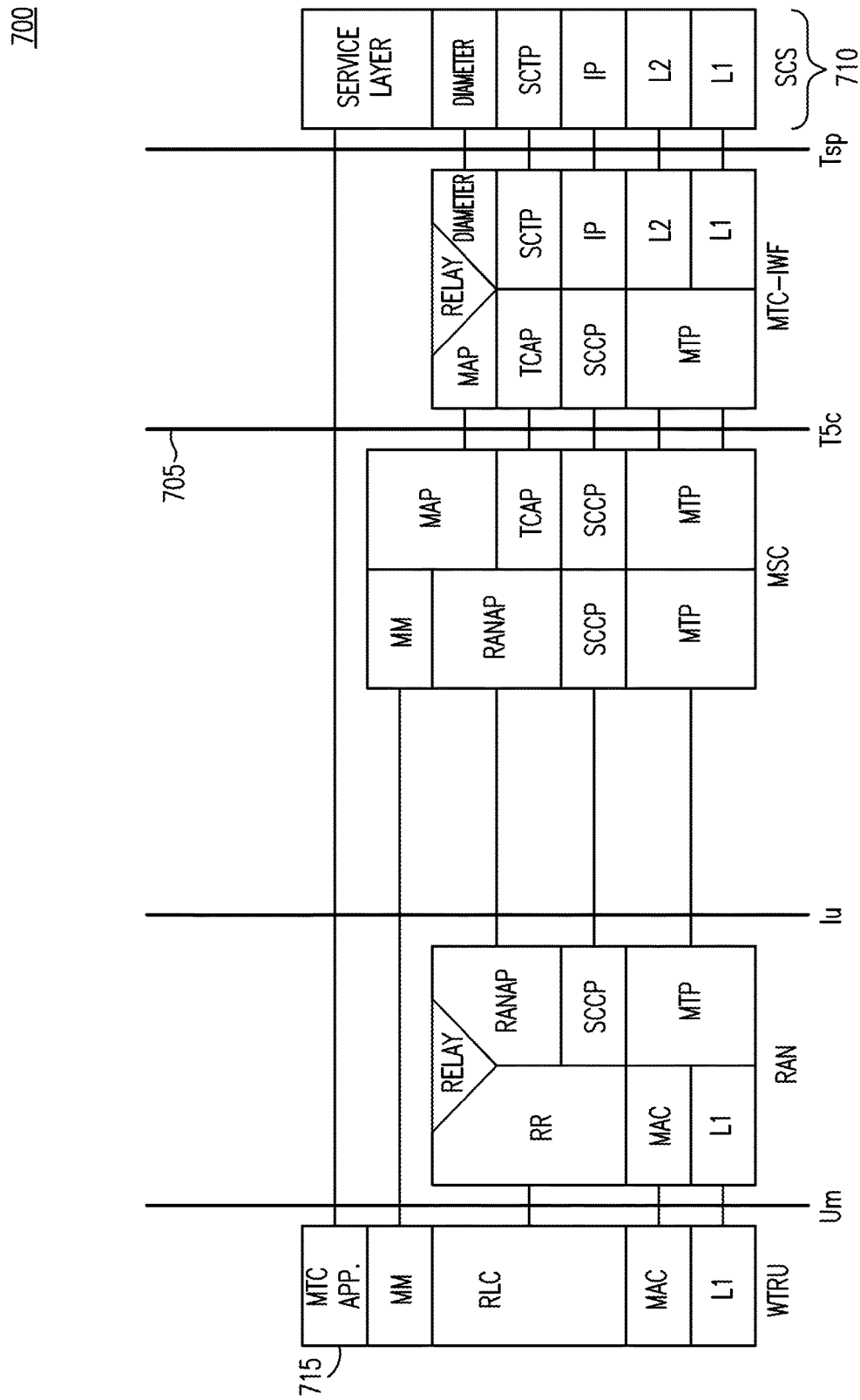
FIG. 6 shows a another example of a trigger/small data protocol stack.

FIG. 6 shows an example of a protocol stack for the T5c interface 705 and how triggers and small data travel from the SCS 710 down to the MTC application 715.

The MTC dispatch function is an application that resides in the WTRU. It may receive triggers and small data via SMS, NAS messaging, USSD operations, or the data plane, dispatch the triggers and small data to the addressed application, accept a response from the addressed application, and acknowledge the trigger or small data packet. The response may include the response from the addressed application.

The MTC dispatch function for T5b triggers is described herein. When an LTE MTC WTRU receives a DOWNLINK GENERIC NAS TRANSPORT message, it may use the "generic message container type" IE to determine that the message is for an MTC application. The EMM entity may use the "additional information" IE to determine the application port number. The MTC application may respond to the EMM entity with an indication of whether or not the trigger or small data was successfully delivered to the application. The EMM Entity may respond to the trigger with a UPLINK GENERIC NAS TRANSPORT message. The UPLINK GENERIC NAS TRANSPORT message may include any data that was provided by the application.

The MTC dispatch function for $T_{xx}$ triggers is described herein. The concept of an MTC dispatch function may not be applicable to $T_{xx}$ triggers. $T_{xx}$ triggers (or small data packets) may be delivered directly to the addressed application. The addressed application may support the CoAP application protocol and listen on its designated port. The $T_{xx}$ delivery method may not preclude the implementation of an application layer dispatch function. For example, a European Telecommunications Standards Institute (ETSI) device gateway services capability layer (D/GSCL) may accept $T_{xx}$ triggers or small data packets. The format of trigger or small data packet may be ETSI-defined. It may be left to the D/GSCL dispatch function to deliver the trigger or small data packet to the application.

The MTC dispatch function for T5c triggers is described herein. When a WTRU receives a REGISTER message, it may use the service code (SC) of the USSD-string to determine that the message is for an MTC application. The USSD-string may include the application identifier (port ID). The MTC application may respond with an indication of whether or not the trigger or small data was successfully delivered to the application. The WTRU may respond to the trigger with a FACILITY message. The FACILITY message may include any data that was provided by the application.

Mobile network operator (MNO) charging for triggering is described herein. There may be on-line and off-line charging aspects to triggering. Call detail records (CDRs) may be generated in an off-line fashion for triggers that are successfully delivered. Each SCS may have a limit, or quota, which controls how many trigger requests they are allowed to submit. SCSs may not be charged for trigger submissions, but may be charged for triggers that are successfully delivered. However, the on-line charging system may monitor the number of triggers that are submitted from each SCS. If an SCS's trigger quota is exceeded, the MTC-IWF may reject all trigger submissions from the SCS until its trigger quota is increased.

On-Line charging for Triggers is described herein. When the trigger request is received from the SCS, the MTC-IWF may use its Ro reference point to check that the SCS has not exceeded its trigger quota. The trigger quota may be adjusted accordingly.

Off-line charging of T4 triggering is described herein. For each trigger that is successfully delivered, the MTC-IWF may initiate a CDR that may be used to charge the SCS and the recipient. The SMS gateway mobile switching center (GMSC) may initiate a CDR that may be used by the recipient's home public land mobile network (HPLMN) to charge the recipient for the trigger delivery. The MME/SGSN may initiate a CDR that may be used by the recipient's visited public land mobile network (VPLMN) to charge the recipient's HPLMN for the trigger delivery.

Off-line charging of T5 Triggering is described herein. For each trigger that is successfully delivered, the MTC-IWF may initiate a CDR that may be used to charge the SCS and the recipient. The serving node may initiate a CDR that may be used by the recipient's VPLMN to charge the recipient for the trigger delivery.

Off-line charging of $T_{xx}$ triggering is described herein. For each trigger that is successfully delivered, the MTC-IWF may initiate a CDR that may be used to charge the SCS and the recipient. The P-GW may initiate a CDR that may be used by the recipient's VPLMN or HPLMN to charge the recipient for the trigger delivery. The serving node may initiate a CDR as it normally would for IP traffic on the default bearers.

The $T_{xx}$ interface is a diameter based interface between the MTC-IWF and the P-GW. The trigger or small data delivery may be supported on this interface. From the perspective of the P-GW, no distinction needs to be made between a trigger and small data from the MTC-IWF. Both are delivered to the device and port number that is specified by the MTC-IWF.

Figure 7A:
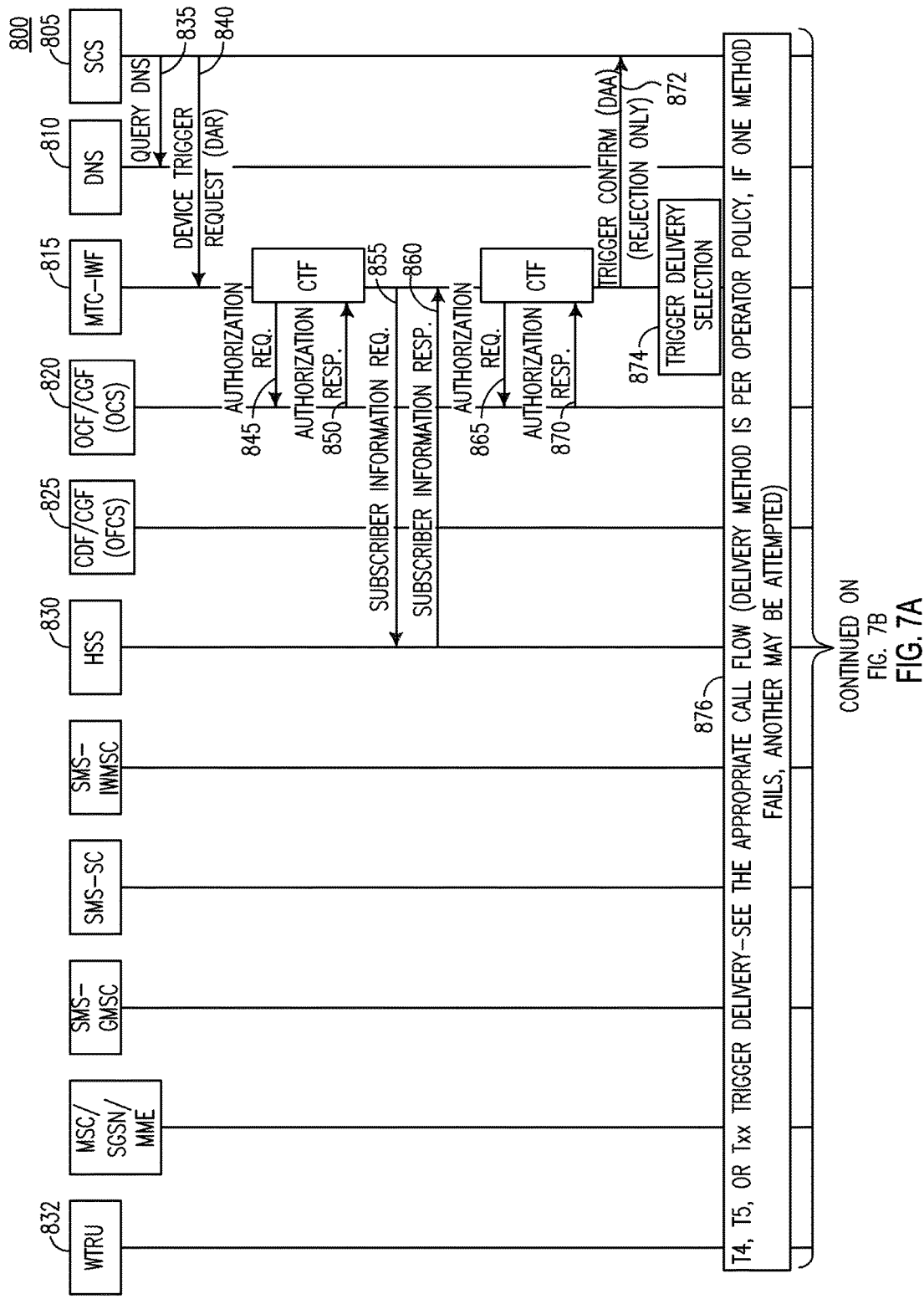
FIGS. 7A and 7B show an example of signal flow of a trigger procedure.
Figure 7B:
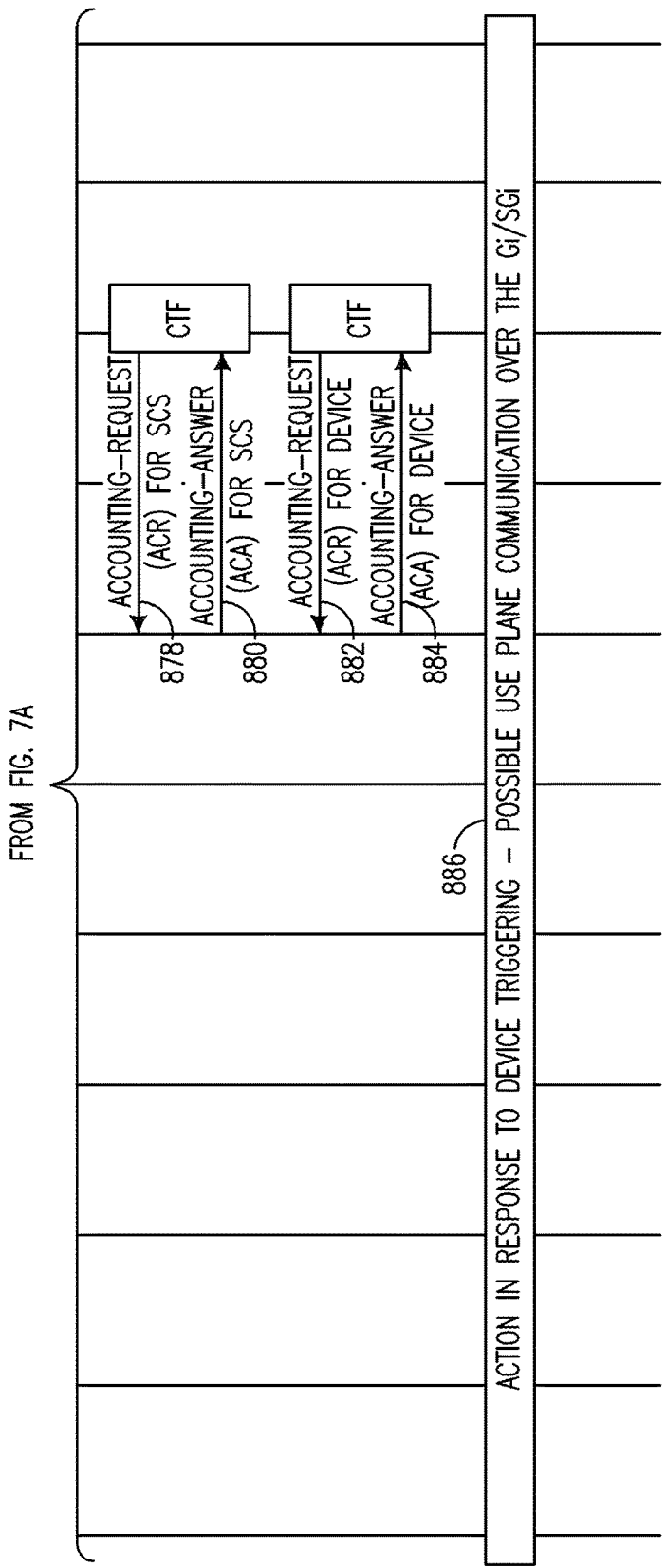

FIGS. 7A and 7B show an example of signal flow of a trigger procedure 800 in a network including an SCS 805, a domain name system (DNS) server 810, an MTC-IWF 815, an OCS 820, an offline charging system (OFCS) 825, an HSS 830 and a WTRU 832. The MTC-IWF 815 may choose which trigger procedure to attempt, (T4, T5 or $T_{xx}$). If one procedure is selected and fails, the MTC-IWF 815 may choose to attempt a different procedure.

In 835 of procedure 800, the SCS 805 may determine the need to trigger the device. If the SCS 805 has no contact details for an MTC-IWF 815, it may determine the IP address(es)/port(s) of the MTC-IWF 815 by performing a DNS query using the external identifier of the WTRU 832 to be triggered. The DNS look-up may not return the IP Address of the MTC device, but instead the IP address of the device's MTC-IWF.

In 840 of procedure 800, the SCS 805 may transmit a device trigger request (Tsp reference point, device action request (DAR) command), (external identifier or mobile station international subscriber directory number (MSISDN), SCS identifier, trigger reference number, validity period, priority, application port number, and trigger payload) message to the MTC-IWF 815.

In 845 of procedure 800, the MTC-IWF 815 may check with the OCS 820 to see if the SCS 805 has exceeded its trigger quota. The message may be sent on the Ro reference point, which may use the diameter protocol. A credit control request (CCR) message may be used. A credit control (CC) request type attribute value pair (AVP) may be set to EVENT_REQUEST. A requested action AVP (requested action (RA)) may be set to DIRECT_DEBITING. The subscription-ID AVP may be set to the MSISDN, IMSI, or external ID of the SCS 805. The subscription-ID AVP may be fully defined by the subscription-ID-type and subscription-ID-data AVPs. The subscription-ID-Type AVP may be updated to support the external ID. The service-information AVP may have been updated to include the MTC information AVP which may indicate that the requested service is triggering.

In 850 of procedure 800, the OCS 820 may respond with an indication if the trigger submission may be authorized. The message may be sent on the Ro reference point, which may use the diameter protocol. A credit control answer (CCA) message may be used. If the SCS 805 has exceeded its trigger quota, the response may include an indication as to when the quota may be refreshed. The quota refresh wait time AVP may be used to indicate the wait time. If the trigger is not authorized, then 855, 860, 865 and 870 of FIG. 7A may be skipped, and 872 may be executed.

In 855 of procedure 800, the MTC-IWF 815 may transmit a subscriber information request, (external identifier or MSISDN, SCS identifier, and service ID), message to the HSS/HLR to determine if the SCS 805 is authorized to trigger the WTRU 832, to resolve the external identifier or MSISDN to IMSI and retrieve the related HSS stored "routing information" including the identities of the WTRU's serving at least one core network (CN) node. The MTC-IWF 815 may cache authorization and routing information for the WTRU 832. However, this may increase the probability of trigger delivery attempt failures when the cached serving node information is stale. Mapping from external identifiers to MSISDN may also be provided for legacy SMS infrastructure not supporting MSISDN-less SMS.

In 860 of procedure 800, the HSS/HLR may transmit the subscriber information response, (IMSI and/or MSISDN, related "routing information" including the serving node(s) identities, cause, supported triggering methods, and preferred triggering method), message. HSS/HLR policy (possibly dependent on the VPLMN ID) may influence which serving node identities are returned. If the cause value indicates that the SCS 805 is not allowed to transmit a trigger message to the WTRU 832, or there is no valid subscription information, the MTC-IWF 815 may transmit a device trigger confirm message with a cause value indicating the reason for the failure condition and the flow stops at 872. Otherwise, this flow continues with 865.

In 865 of procedure 800, the MTC-IWF 815 may check with the OCS 820 to see if the device has exceeded its trigger quota. The message may be sent on the Ro reference point, which may use the diameter protocol. A CCR message may be used. The CC-Request-Type AVP may be set to EVENT_REQUEST. The RA AVP may be set to DIRECT_DEBITING. The subscription-ID AVP may be set to the MSISDN, IMSI, or external ID of the trigger recipient. The subscription-ID AVP may be fully defined by the subscription-ID-type and subscription-ID-data AVPs. The Subscription-ID-type AVP may be updated to support the external ID. The service-information AVP may include the MTC-information AVP which may indicate that the requested service is triggering.

In 870 of procedure 800, the OCS 820 may respond with an indication if the trigger submission may be authorized. The message may be sent on the Ro reference point, which may use the diameter protocol. The CCA message may be used. If the SCS 805 has exceeded its trigger quota, the response may include an indication as to when the quota may be refreshed. The quota refresh wait time AVP may be used to indicate the wait time.

In 872 of procedure 800, the MTC-IWF 815 may transmit a trigger confirm, (TSP reference point, DAA command), message to the SCS 805. The trigger confirm message may indicate to the SCS 805 if the trigger request was accepted. If the trigger was not accepted, a cause value may be provided. Possible rejection causes may include that the SCS trigger quota has been exceeded, the devices trigger quota has been exceeded, the device identifier is not recognized, or the SCS 805 is not permitted to trigger this device. If the trigger was not accepted because of a temporary condition, such as a exceeding a trigger rate, then the trigger confirm message may include an estimate as to how long the SCS 805 should wait before trying again. The quota refresh wait time AVP may be used to indicate the wait time.

In 874 of procedure 800, the MTC-IWF 815 may select a trigger delivery procedure based on the information received from the HSS 830 and local policy. If one procedure fails, the MTC-IWF 815 may choose to attempt a different procedure, (the T5 and $T_{xx}$ delivery are not supported in R11).

In 876 of procedure 800, the T4, T5, or $T_{xx}$ trigger procedure is executed. These procedures are described below.

In 878 of procedure 800, the MTC-IWF 815 may generate charging data for delivering the trigger on behalf of the SCS 805. The message may be sent on the Rf reference point, which may use the diameter protocol. An accounting request (ACR) message may be used. The subscription-ID AVP may be set to the MSISDN, IMSI, or external ID of the SCS 805. The Subscription-ID AVP may be fully defined by the subscription-ID-type and subscription-ID-data AVPs. The subscription-ID-type AVP may be updated to support the external ID. The service information AVP may be updated to include the MTC information AVP, which may indicate that the provided service was triggering.

In 880 of procedure 800, the OFCS 825 may respond with an indication if the charging information has been recorded. The message may be sent on the Rf reference point, which may use the diameter protocol. An accounting-answer (ACA) message may be used.

In 882 of procedure 800, the MTC-IWF 815 may generate charging data for delivering the trigger to the device. The message may be sent on the Rf reference point, which may use the diameter protocol. An ACR message may be used. The subscription-ID AVP may be set to the MSISDN, IMSI, or external ID of the device. The subscription-ID AVP may be fully defined by the subscription-ID-type and subscription-ID-data AVPs. The subscription-ID-type AVP may be updated to support the external ID. The service information AVP may be updated to include the MTC information AVP, which may indicate that the provided service was triggering.

In 884 of procedure 800, the OCS 820 may respond with an indication if the charging information has been recorded. The message may be sent on the Rf reference point, which may use the diameter protocol. An ACA message may be used.

In 886 of procedure 800, in response to the received device trigger, the WTRU 832 may take specific actions that take into consideration the content of the trigger payload. This response may involve the initiation of immediate or later communication with the SCS 805 or an application server (AS) via the Gi/SGi interfaces.

Figure 8:
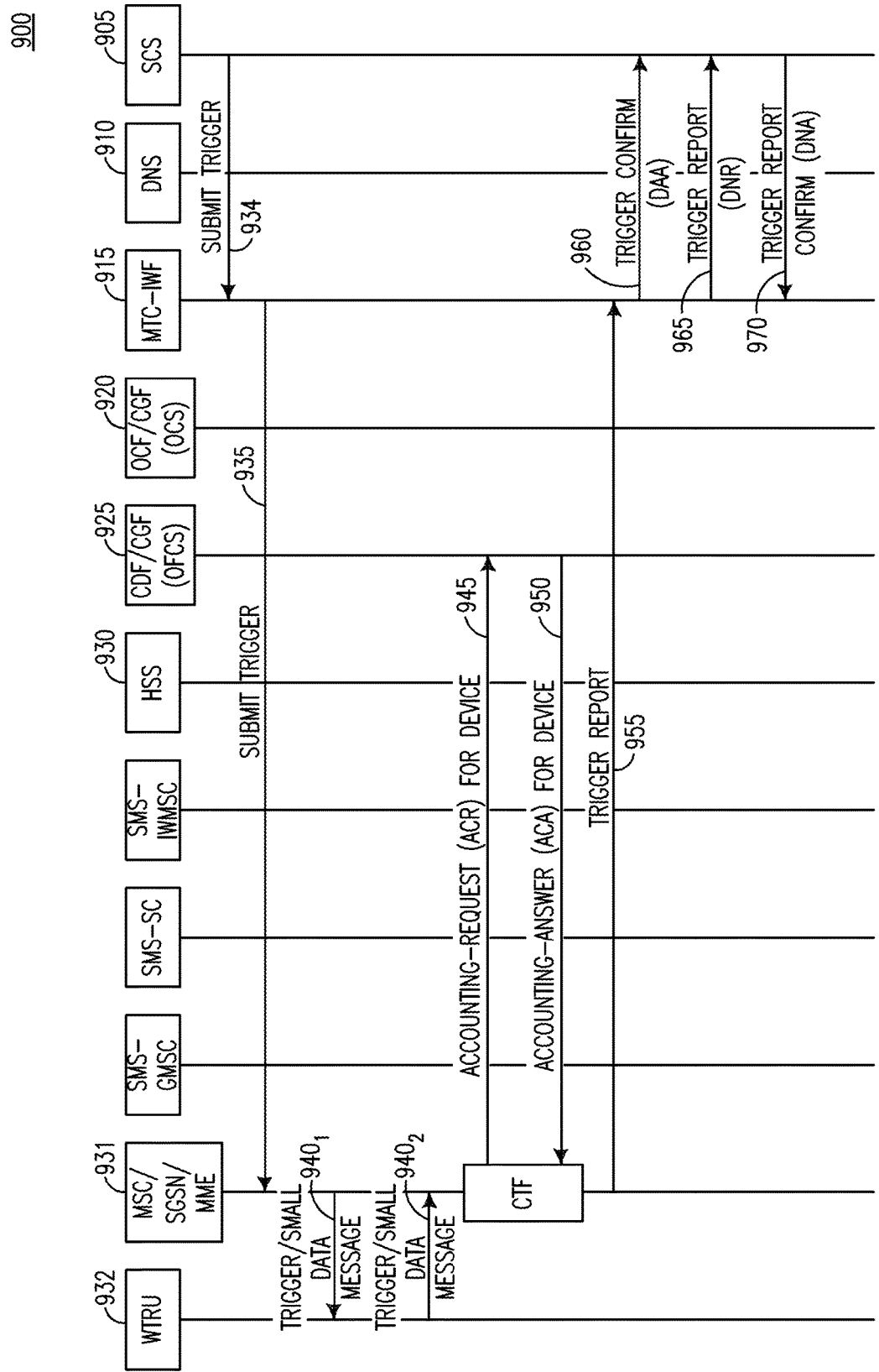
FIG. 8 shows an example of signal flow of a trigger procedure.

FIG. 8 shows an example of signal flow of a T5b trigger procedure 900 in a network including an SCS 905, a DNS Server 910, an MTC-IWF 915, an OCS 920, an OFCS 925, an HSS 930, an MME 931 and a WTRU 932. The procedure 900 may be selected based on operator policies.

In 934 of procedure 900, a trigger may be submitted over the Tsp interface by the SCS 905. The SCS 905 may submit the trigger to the MTC-IWF 915, the MTC-IWF 915 may authorize the trigger request, the MTC-IWF 915 may resolve the device external identifier to an IMSI and get the address of the device's MME, and the MTC-IWF 915 may decide to use T5b delivery.

In 935 of procedure 900, the MTC-IWF 915 may use the WTRU capabilities and serving CN node capabilities retrieved from the HSS 930 to select a suitable MME capable of T5b triggering. The MTC-IWF 915 may transmit a submit request (device action request (DAR)), (IMSI, message priority, MTC-IWF ID, reference number, single delivery attempt flag (optional), validity time (optional), request type (trigger application), application protocol data unit (PDU), application port number), to the serving CN node. If there is more than one serving CN node, the MTC-IWF 915 may transmit the message to the serving CN node where the WTRU 932 is currently camping with highest probability, (e.g., based on information received from the HSS 930 or cached information from an earlier trigger).

In 940$_1$ of procedure 900, the serving CN node may deliver the trigger to the WTRU. The trigger may be delivered using the "DOWNLINK GENERIC NAS TRANSPORT" message. The "Generic Message Container Type" IE may be set to "MTC trigger or small data". The "additional information" IE may be used to carry the application port number. The new "MTC reference number IE" may be used to carry the reference number. If the WTRU 932 is in idle mode, the serving CN node may page the WTRU 932 prior to delivering the trigger.

In 940$_2$ of procedure 900, the WTRU 932 may transmit an acknowledgement to the serving node. The WTRU 932 may respond using the "UPLINK GENERIC NAS TRANSPORT" message. The "generic message container type" IE may be set to "MTC trigger or small data". The generic message container may be used to carry an application specific response to the MME. The application data may indicate if the trigger was successfully delivered and other application specific data. The "additional information" IE may be used to carry the port number of the application that is responding. The new "MTC reference number IE" may be used to carry the reference number.

In 945 of procedure 900, the MME 931 may generate charging data for delivering the trigger to the device. The message may be sent on the Rf reference point, which may use the diameter protocol. The ACR message may be used. The subscription-ID AVP may be set to the MSISDN, IMSI, or external ID of the device. The subscription-ID AVP may be fully defined by the subscription-ID-type and subscription-ID-data AVPs. The subscription-ID-type AVP may be updated to support the external ID. The service information AVP may be updated to include the MTC information AVP, which may indicate that the provided service was triggering.

In 950 of procedure 900, the OFCS 925 may respond with an indication if the charging information has been recorded. The message may be sent on the Rf reference point, which may use the diameter protocol. An ACA message may be used.

In 955 of procedure 900, the MME 931 may transmit a delivery report (device action answer), (IMSI, cause, reference number, delivered by CN node, response type (trigger application), and if received, the application container), message to the MTC-IWF 915. The cause may indicate whether the trigger message was successfully delivered to the WTRU 932 or, if it failed, the reason for the failure. For MME delivery, the application specific data in the generic NAS container that was received in 940$_2$ may be transparent to the serving node.

In 960 of procedure 900, the MTC-IWF 915 may transmit a trigger confirm (TSP reference point, DAA command) message to the SCS 905. The trigger confirm message may indicate to the SCS 905 if the trigger request was accepted.

In 965 of procedure 900, the MTC-IWF 915 may transmit the device trigger report (TSP reference point, DNR command), (external identifier or MSISDN and trigger reference number and if received the application container), message to the SCS 905 with a cause value indicating whether the trigger delivery succeeded or failed and the reason for the failure.

In 970 of procedure 900, the SCS 905 may transmit the device trigger report confirm message to acknowledge the receipt of the trigger report, (TSP reference point, DNA command).

The messages in 965 and 970 may be avoided by including the trigger report in 965. However, by including 965 and 970, the MTC server may detect a consistent message flow when transmitting a trigger, regardless of the underlying triggering delivery method.

Figure 9:
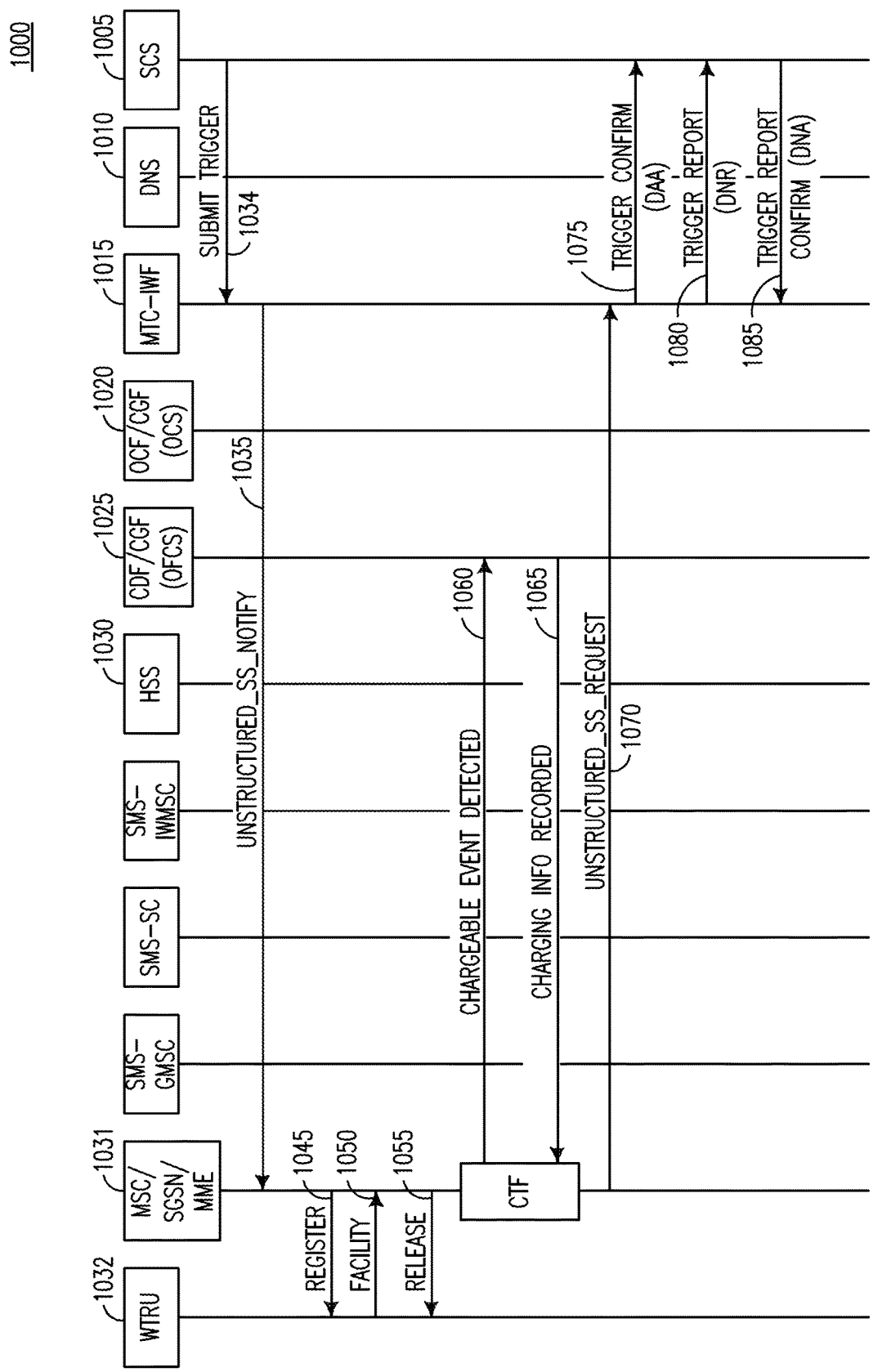
FIG. 9 shows another example of signal flow of a trigger procedure.

FIG. 9 shows an example of signal flow of a T5c trigger procedure 1000 in a network including an SCS 1005, a DNS Server 1010, an MTC-IWF 1015, an OCS 1020, an OFCS 1025, an HSS 1030, a mobile switching center (MSC) 1031 and a WTRU 1032. The procedure 1000 may be selected based on operator policies.

In 1034 of procedure 1000, a trigger may be submitted over the Tsp interface by the SCS 1005. The SCS 1005 may submit the trigger to the MTC-IWF 1015. The MTC-IWF 1015 may authorize the trigger request. The MTC-IWF 1015 may resolve the device external identifier to an IMSI and get the address of the device's MME. The MTC-IWF 1015 may decide to use T5b delivery.

In 1035 of procedure 1000, the MTC-IWF may use the WTRU capabilities, serving CN node(s) capabilities retrieved from the HSS 1030 to select a suitable serving MSC 1031 capable of T5c triggering. If there is more than one serving CN node, the MTC-IWF 1015 may transmit the message to the serving CN node where the WTRU 1032 is currently camping with highest probability, (e.g., based on information received from HSS 1030 or cached information from earlier trigger). On receipt of a device action request (DAR) from the SCS 1005, a USSD request may be initiated by the MTC-IWF 1015 using a MAP protocol. The WTRU 1032 may be identified using MSISDN that is retrieved from the HSS 1030 if the WTRU context is unavailable with the MTC-IWF 1015. The USSD string may be of format *SC*SI#, where SC is the service code and SI is the supplementary information. SC is a new standardized code or an operator configured non-standard code. SI may contain the device trigger data from the SCS 1005. The SI parameter of the UNSTRUCTURED_SS_NOTIFY message may be used to carry MSISDN, message priority, reference number, single delivery attempt flag, validity time, request type (trigger), trigger payload, application ID (port number) and response requested.

In 1045 of procedure 1000, the MSC 1031 may deliver the trigger in the form of a USSD request to the WTRU 1032 using the REGISTER message. If no response is expected from the WTRU 1032, then the invoke field of the REGISTER message may be set to unstructured SS notify. If a response is expected from the WTRU 1032, then the invoke field of the REGISTER message may be set to unstructured SS request. The USSD data coding scheme and USSD string that were received in 1035 may be forwarded to the WTRU 1032. If the WTRU 1032 is in idle mode, the serving CN node may page the WTRU 1032 prior to delivering the trigger.

In 1050 of procedure 1000, the WTRU 1032 may transmit an acknowledgement to the MSC 1031 in the form of a FACILITY message. The WTRU 1032 may provide a trigger response by setting the result field of the FACILITY message to unstructured SS request and using the USSD string parameter carry a reference number, application payload and application ID (port number).

In 1055 of procedure 1000, the MSC 1031 may terminate the dialog by transmitting the RELEASE message.

In 1060 of procedure 1000, the MSC may generate charging data for delivering the trigger to the device. The following information may be included in the message: the MSISDN, IMSI, or external ID of the device, and an indication that the provided service was triggering.

In 1065 of procedure 1000, the OFCS 1025 may respond with an indication if the charging information has been recorded.

In 1070 of procedure 1000, the MSC may transmit a delivery report message to the MTC-IWF. The UNSTRUCTURED_SS_REQUEST message may be used to deliver the report. The USSD string parameter of the UNSTRUCTURED_SS_REQUEST message may be used to carry an MSISDN, a reference number, an application response, an application ID (port number), and a failure cause.

In 1075 of procedure 1000, the MTC-IWF 1015 may transmit a trigger confirm (TSP reference point, DAA command) message to the SCS 1005. The trigger confirm message may indicate to the SCS 1005 if the trigger request was accepted.

In 1080 of procedure 1000, the MTC-IWF 1015 may transmit the device trigger report, (TSP reference point, DNR command), (external identifier or MSISDN and trigger reference number and, if received, the application container), message to the SCS 1005 with a cause value indicating whether the trigger delivery succeeded or failed and the reason for the failure.

In 1085 of procedure 1000, the SCS 1005 may transmit the device trigger report confirm message to acknowledge the receipt of the trigger report (TSP reference point, DNA command).

The messages in 1080 and 1085 may be avoided by including the trigger report in 1075. However, by including 1080 and 1085, the MTC server may detect a consistent message flow when transmitting a trigger, regardless of the underlying triggering delivery method.

Figure 10:
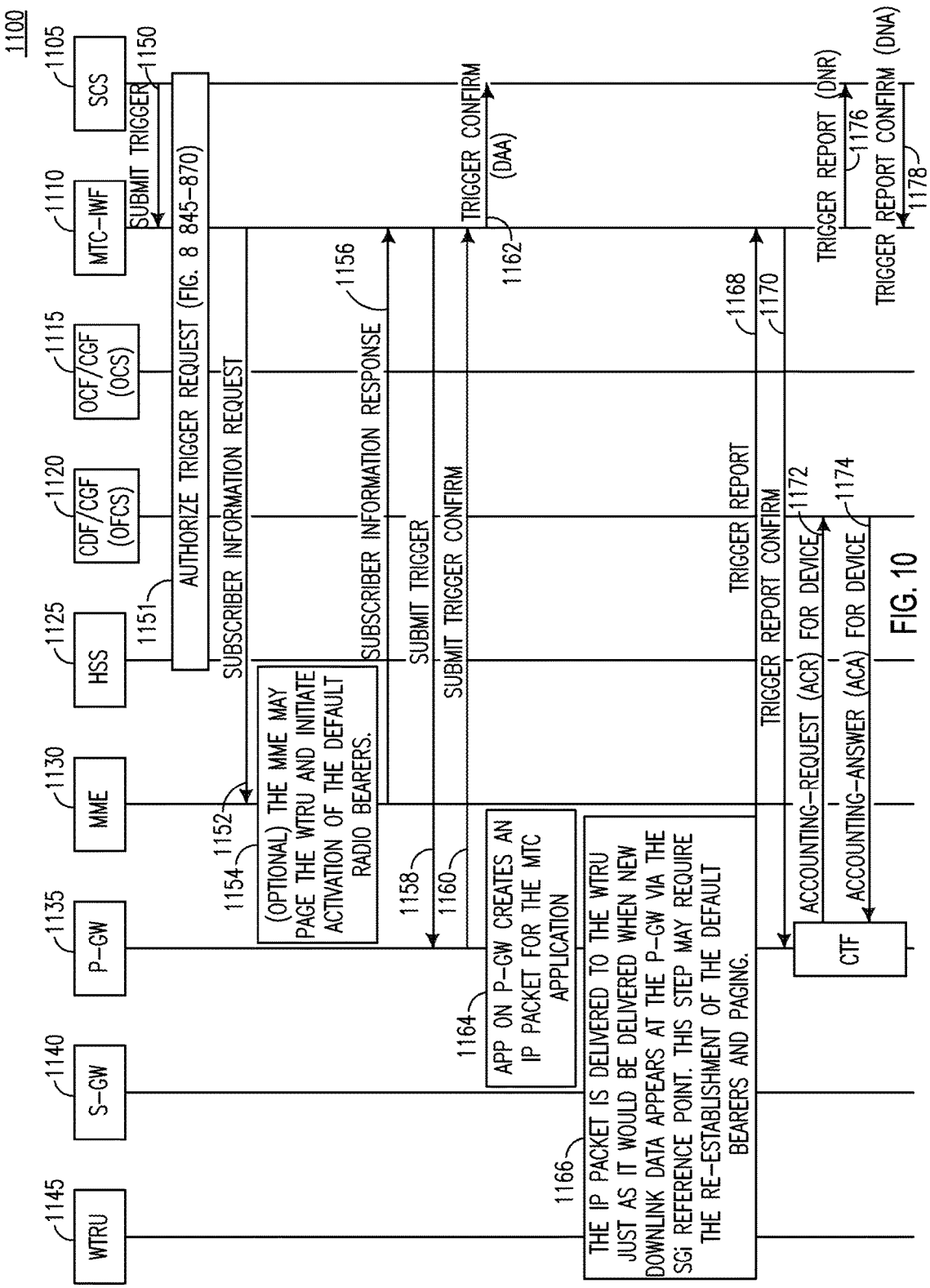
FIG. 10 shows another example of signal flow of a trigger procedure.

FIG. 10 shows an example of signal flow of a $T_{xx}$ trigger procedure 1100 in a network including an SCS 1105, an MTC-IWF 1110, an OCS 1115, an OFCS 1120, an HSS 1125, an MME 1130, a P-GW 1135, an S-GW 1140 and a WTRU 1145. The procedure 1100 may be selected based on operator policies.

In 1150 of procedure 1100, a trigger may be submitted over the Tsp interface by the SCS 1105. The SCS 1105 may submit the trigger to the MTC-IWF 1110. The MTC-IWF 1110 may authorize the trigger request 1151 using a procedure such as that shown in 845, 850, 855, 860, 865, and 870 in FIG. 7. The MTC-IWF 1110 may resolve the device external identifier to an IMSI and get the address of the device's MME 1130.

In 1152 of procedure 1100, the MTC-IWF 1110 may transmit a subscriber information request (device information request (DIR) command), (IMSI, requested-param=P-GW-ID) to the MME 1130. The purpose of this request may be to see if the subscriber is present and to obtain the identity of the P-GW 1135.

In 1154 of procedure 1100, if the subscriber is present, the MME 1130 may begin the process of paging the WTRU 1145 and setting up the default radio bearers if they are not already set up.

In 1156 of procedure 1100, if the subscriber is present, the MME 1130 may provide the MTC-IWF 1110 with the identity of the P-GW 1135 (device information answer (DIA) command). If the subscriber is not present, the MTC-IWF 1110 may stop the $T_{xx}$ trigger process and it may choose to attempt T4 trigger delivery.

In 1158 of procedure 1100, the MTC-IWF 1110 may transmit a submit request ($T_{xx}$ device trigger request command), (IMSI, device application port number, payload) to the P-GW 1135. This request may be sent using the $T_{xx}$ interface.

In 1160 of procedure 1100, the P-GW 1135 may transmit a submit trigger confirm message, ($T_{xx}$ device trigger answer command), to the MTC-IWF 1110 to confirm that the submission of the trigger has been accepted by the P-GW 1135. The P-GW 1135 may reject the submission if the IMSI is not currently associated with any S5/S8 bearers.

In 1162 of procedure 1100, the MTC-IWF 1110 may transmit a device trigger confirm message (TSP reference point, DAA command) to the SCS 1105 to confirm that the device trigger request has been accepted for delivery to the WTRU 1145.

In 1164 of procedure 1100, the trigger distributor application on the P-GW 1135 may use the device's IMSI to determine the device's IP address. The trigger distributor application may transmit the trigger payload to the port number that was specified in the trigger submission. The trigger distributor may be a CoAP-based and it may transmit the message as a confirmable CoAP message so that a CoAP ACK may be expected from the WTRU 1145.

In 1166 of procedure 1100, the IP packet(s) may be delivered to the specified transport address (IP address/port number). If the S1 and radio bearers are in the released state, this may indicate that the WTRU 1145 may be paged and the bearers may be re-established. Since the CoAP trigger message may be confirmable, the WTRU 1145 may transmit a CoAP ACK back to the trigger distributor application of the P-GW 1135. The ACK message may include application data.

In 1168 of procedure 1100, once the CoAP ACK is received or the CoAP delivery attempt(s) time out, the P-GW 1135 may transmit a message delivery report, ($T_{xx}$ device trigger answer command), (cause code, trigger reference number, SCS identifier, application data), to the MTC-IWF 1110. The CoAP ACK may contain an application specific payload. If the ACK does contain application specific data, it may be forwarded to the MTC-IWF 1110 and the SCS 1105.

In 1170 of procedure 1100, the MTC-IWF 1110 may transmit the message delivery report confirm ($T_{xx}$ trigger report answer command) to the P-GW 1135 to acknowledge receipt of the delivery report.

In 1172 of procedure 1100, the P-GW 1135 may generate charging data for delivering the trigger to the device. The message may be sent on the Rf reference point, which may use the diameter protocol. An ACR message may be used. The subscription-ID AVP may be set to the MSISDN, IMSI, or external ID of the device. The subscription-ID AVP may be fully defined by the subscription-ID-type and subscription-ID-data AVPs. The subscription-ID-type AVP may have been updated to support the external ID. The service information AVP may have been updated to include the MTC information AVP, which may indicate that the provided service was triggering.

In 1174 of procedure 1100, the OFCS 1120 may respond with an indication if the charging information has been recorded. The message may be sent on the Rf reference point, which may use the diameter protocol. An ACA message may be used.

In 1176 of procedure 1100, the MTC-IWF 1110 may transmit the device trigger report (TSP reference point, DNR command), (external identifier or MSISDN and trigger reference number and the application container if received), message to the SCS 1105 with a cause value indicating whether the trigger delivery succeeded or failed and the reason for the failure.

In 1178 of procedure 1100, the SCS 1105 may transmit the device trigger report confirm message to acknowledge the receipt of the trigger report (TSP reference point, DNA command).

Several Tsp commands used to support a Tsp interface are described below.

A device action request (DAR) command may be used to request a trigger. The DAR command may carry a device action AVP which describes whatever action is being requested, (e.g., triggering). The device action AVP may be modified to carry a new AVP called an application response request. This AVP may be used by the SCS to indicate if the SCS desires an application level response in the trigger report.

A device action answer (DAA) command may be used to confirm receipt of the trigger request.

The quota refresh wait time AVP may be used to indicate when the SCS or device trigger quota may be refreshed. This AVP may be used when a trigger request is rejected due to an exceeded quota.

A device notification request (DNR) command may be used to transmit the trigger delivery report to the SCS. This command may use a device notification to report to the SCS the result of trigger, (success, failure, and the like). The device notification AVP may have been modified so that it may carry the WTRU application's response to the trigger. The WTRU application response may be an acknowledgement of the trigger or it may carry some application specific information such as a sensor reading.

A device notification answer (DNA) command may be used by the SCS to acknowledge the trigger report.

Several different Tsp AVPs are described below.

A device notification AVP may be modified to carry an application response. The device notification AVP is of type "grouped". It may be used by the MTC-IWF to report any action requested by the SCS.

A device action AVP may be modified by adding an application response request. The device action AVP may be of type "grouped". It may be used by the SCS to request a specific action for a device.

An application response expected AVP may be of type "enumerated", and may indicate to the MTC-IWF if the SCS expects an application layer response in the trigger report. This information may be used by the MTC-IWF when selecting the trigger delivery method. When the application response expected AVP is not included in the trigger request, an application layer response may not be required in the trigger report.

A no-response-required (0) value may indicate that application layer response is not required in the trigger report.

A response-preferred (1) value may indicate that an application layer response would be preferred in the trigger report, but it is not required. A data plane response may be acceptable.

A response-required (2) value may indicate that an application layer response may be required in the trigger report.

The $T_{xx}$ interface is a new interface between the MTC-IWF and the P-GW. Several $T_{xx}$ commands are described below.

A $T_{xx}$ device trigger request command may be sent from the MTC-IWF to the P-GW.

A $T_{xx}$ device trigger answer command may be sent from the P-GW to the MTC-IWF.

A $T_{xx}$ trigger report request command may be sent from the P-GW to the MTC-IWF.

A $T_{xx}$ trigger report answer command may be sent from the MTC-IWF to the P-GW.

A device information request (DIR) command may be used by the MTC-IWF to request the address of the P-GW serving the WTRU.

A device information answer (DIA) command may be used by the serving node to provide the address of the P-GW to the MTC-IWF.

The requested-param AVP is of type "enumerated" and it may identify the parameter requested by the MTC-IWF. The following values are defined: P-GW ID (0), BSF ID (1) and KEY MATERIAL (2).

The Ro interface may be used by core network nodes to provide charging information to the OCS.

A credit control answer (CCA) message may be modified to include a call quota-refresh-wait-time AVP.

Ro specific AVPs may include a service information AVP which may be of type "grouped". It may allow the transmission of additional 3GPP service specific information elements.

The format and the contents of the fields inside the service information AVP may be service-specific, (i.e., the format will be different for the various services).

The subscription-Id AVP in service information AVP may be used on the Rf interface. Further fields may be included in the service information AVP when new services are introduced.

An MTC information AVP may be of type "grouped". It may allow the transmission of additional MTC service specific information elements.

A client address AVP may provide the address of the node that the OCS is connected to.

A service ID AVP may indicate the MTC service.

A reference number AVP may serve as the trigger or small data reference number.

The quota refresh wait time AVP may be of type "Unsigned32" and contain a time value in seconds. This time value may indicate how long the client should wait before expecting the quota to be refreshed.

FIG. 11 shows an example of downlink generic non-access stratum (NAS) transport message content. A downlink generic NAS transport message is an EPS mobility management message. This message may be sent by the network to the WTRU in order to carry an application protocol message in encapsulated format, as shown in FIG. 11. The message type is DOWNLINK GENERIC NAS TRANSPORT, its significance is dual, and it may be sent from the network to WTRU. This message may be used to carry triggers and small data to MTC applications. The additional information IE 1210 may be used to carry the application port number. The new reference number IE 1220 may be used to indicate the trigger or small data reference number. The generic message container 1205 may be used to carry the small data or trigger payload.

FIG. 12 shows an example of uplink generic NAS transport message content. An uplink generic NAS transport message is an EPS mobility management message. This message may be sent by the WTRU to the network in order to carry an application protocol message in encapsulated format, as shown in FIG. 12. The message type is UPLINK GENERIC NAS TRANSPORT, its significance is dual, and it may be sent from the WTRU to the network. This message may be used to carry triggers responses, small data responses, and small data messages from the WTRU to the network. The additional information IE 1310 may be used to indicate the application port number. When the message is a response, the new reference number IE 1320 may be used to indicate the trigger or small data reference number. When the message is a small data message from the WTRU, the reference number IE 1320 may be set to 0. The generic message container 1305 may be used to carry the small data, small data response, or trigger response.

FIG. 13 shows an example of a generic message container type information element. EPS mobility management information elements are described herein. Updates to existing layer 3 information elements or new IEs are also described herein. For backward compatibility, all new IEs are defined as a type-length-value (TLV) format. The purpose of a generic message container type IE may be to specify the type of message contained in the generic message container IE. As an example, a generic message container type IE may be used to identify the purpose of an NAS transport message as a trigger or as a small data packet. The generic message container type IE may be coded as shown in FIG. 13. A new encoding may be added to FIG. 13 to support the delivery of small data and triggers using new cause values.

FIG. 14 shows an example of an MTC reference number IE used to indicate the reference number that is associated with the MTC trigger, MTC small data, MTC trigger response, or MTC small data response. The WTRU may set the MTC reference number 1510 to 0 when transmitting an uplink small data message that is not a response to a downlink message. The MTC reference number may be a type 3 IE having a two (2) octet length.

FIG. 15 shows an example of a node 1600 in a packet data network. Node 1600 includes a transmitter 1605, a receiver 1610, and a processor 1615 operatively connected to transmitter 1605 and receiver 1610. An antenna 1620 is coupled to both transmitter 1605 and receiver 1610. Alternatively, one or more antennas may be coupled to transmitter 1605 and one or more other, distinct antennas may be coupled to receiver 1610. Showing one antenna 1620 is not to be construed as limiting. In one embodiment, node 1600 is a first node that includes transmitter 1605 configured to transmit a subscriber information request to see whether a subscriber is present, receiver 1610 configured to receive an identity of a second node on a condition that the subscriber is present. Receiver 1610 may be further configured to receive an identity of a second node on a condition that the subscriber is present. Transmitter 1605 may be further configured to transmit the trigger or small data packet to the second node over a $T_{xx}$ interface, the second node configured to create an Internet Protocol (IP) packet with an IP address containing the trigger or small data packet and deliver the IP packet to a wireless transmit/receive unit (WTRU) using the IP address and a default or dedicated bearer of the WTRU.

Receiver 1610 may be further configured to receive a message confirming that the trigger or small data packet has been accepted by the second node. Receiver 1610 may be further configured to receive a delivery report, reporting whether or not the trigger or small data packet has been delivered.

Node 1600 may include a machine type communication interworking function or packet data network gateway.

In a second embodiment, receiver 1610 may be configured to receive a trigger or small data packet, processor 1615 may be configured to create a downlink generic non-access stratum (NAS) transport message with contents of the trigger or small data packet, and transmitter 1605 may be configured to transmit the NAS transport message to a wireless transmit/receive unit (WTRU). Processor 1615 may be configured to use a generic message container type information element (IE) to identify the NAS transport message. Processor 1615 may be use an additional IE to identify an application configured to receive the trigger or small data packet. Transmitter 1605 may be configured to deliver a trigger payload or a small data payload in a generic message container type information element. Receiver 1610 may be configured to receive a trigger report from the WTRU using an uplink generic NAS transport message. Node 1600 may include a mobility management entity.

In a third embodiment, transmitter 1605, receiver 1610, and processor 1615 may be configured to use an online charging system (OCS) to check if at least one of the SCS or a device has exceeded a trigger submission quota. Receiver 1610 may be further configured to receive an indication from the OCS as to whether or not the trigger is authorized. Transmitter 1605, receiver 1610, and processor 1615 may be configured to use an Ro interface to communicate with the OCS. Node 160 may include a machine type communication interworking function.

Embodiments

1. A method, implemented by a first node, for delivering a trigger or a small data packet, the method comprising:
receiving a trigger or small data packet;
transmitting a subscriber information request to determine whether a subscriber is present;
receiving an identity of a second node on a condition that the subscriber is present; and
transmitting the trigger or small data packet to the second node over a $T_{xx}$ interface, wherein the second node creates an Internet Protocol (IP) packet with an IP address containing the trigger or small data packet and delivers the IP packet to a wireless transmit/receive unit (WTRU) using the IP address and a default or dedicated bearer of the WTRU.

2. The method of embodiment 1 further comprising: on a condition that the WTRU is in idle mode, activating the default bearer and delivering the trigger or small data packet to the WTRU.

3. The method as in any one of embodiments 1-2 wherein the activating of the default bearer comprises the use of a mobility management entity (MME).

4. The method as in any one of embodiments 1-3, further comprising:
receiving a message confirming that the trigger or small data packet has been accepted by the second node; and
receiving a delivery report, reporting whether or not the trigger or small data packet has been delivered.

5. The method as in any one of embodiments 1-4 further comprising:
the second node resolving an international mobile subscriber identity (IMSI) of the WTRU to the IP address; and
using an IP address of the second node to transmit a message including trigger payload to the IP address of the WTRU and a port number specified by the trigger.

6. The method as in any one of embodiments 1-5, wherein the first node performing the method comprises a machine type communication interworking function.

7. The method as in any one of embodiments 1-6, wherein the second node performing the method comprises a packet data network gateway.

8. A method, implemented by a node, for delivering a trigger or a small data packet, the method comprising:
receiving a trigger or small data packet;
creating a downlink generic non-access stratum (NAS) transport message with contents of the trigger or small data packet; and
transmitting the downlink generic NAS transport message to a wireless transmit/receive unit (WTRU).

9. The method of embodiment 8 further comprising:
using a generic message container type information element (IE) to identify the purpose of the NAS transport message as a trigger or as a small data packet.

10. The method as in any one of embodiments 8-9 further comprising:
using an additional IE to identify an application configured to receive the trigger or small data packet 11. The method as in any one of embodiments 8-10, further comprising delivering a trigger payload or a small data payload in a generic message container type IE.

12. The method as in any one of embodiments 8-11, further comprising receiving a trigger report from the WTRU using an uplink generic NAS transport message.

13. The method as in any one of embodiments 8-12, wherein the node performing the method comprises a mobility management entity (MME).

14. A trigger authorization method performed by a node, the method comprising:
receiving a trigger from a services capability server (SCS); and
using an online charging system (OCS) to check if at least one of the SCS or a device has exceeded a trigger submission quota.

15. The method as in embodiment 14 further comprising receiving an indication from the OCS as to whether or not the trigger is authorized.

16. The method as in any one of embodiments 14-15 further comprising:
using an Ro interface to communicate with the OCS.

17. The method as in any one of embodiments 14-16, wherein the node performing the method comprises a machine type communication interworking function.

18. A first node in a packet data network, comprising:
a receiver configured to receive a trigger or small data packet;
a transmitter configured to transmit a subscriber information request to see whether a subscriber is present;
the receiver further configured to receive an identity of a second node on a condition that the subscriber is present; and
the transmitter further configured to transmit the trigger or small data packet to the second node over a $T_{xx}$ interface, the second node configured to create an Internet Protocol (IP) packet with an IP address containing the trigger or small data packet and deliver the IP packet to a wireless transmit/receive unit (WTRU) using the IP address and a default or dedicated bearer of the WTRU.

19. The first node of embodiment 18, wherein the receiver is further configured to:
receive a message confirming that the trigger or small data packet has been accepted by the second node; and
receive a delivery report, reporting whether or not the trigger or small data packet has been delivered.

20. The first node as in any one of embodiments 18-19, wherein the first node comprises a machine type communication interworking function.

21. A node in a packet data network, comprising:
a receiver configured to receive a trigger or small data packet;
a processor configured to create a downlink generic non-access stratum (NAS) transport message with contents of the trigger or small data packet; and
a transmitter configured to transmit the NAS transport message to a wireless transmit/receive unit (WTRU).

22. The node of embodiment 21, wherein the processor is configured to use a generic message container type information element (IE) to identify the purpose of the NAS transport message as a trigger or as a small data packet.

23. The node as in any one of embodiments 21-22, wherein the processor is configured to use an additional IE to identify an application configured to receive the trigger or small data packet.

24. The node as in any one of embodiments 21-23, wherein the transmitter is further configured to deliver a trigger payload or a small data payload in a generic message container type IE.

25. The node as in any one of embodiments 21-24, wherein the receiver is configured to receive a trigger report from the WTRU using an uplink generic NAS transport message.

26. The node as in any one of embodiments 21-25, comprising a mobility management entity.

27. A node in a packet data network, comprising: a receiver configured to receive a trigger from a services capability server (SCS);
a transmitter; and
a processor;
wherein the receiver, transmitter, and processor are configured to use an online charging system (OCS) to check if at least one of the SCS or a device has exceeded a trigger submission quota.

28. The node of embodiment 27, wherein the receiver is further configured to receive an indication from the OCS as to whether or not the trigger is authorized.

29. The node as in any one of embodiments 27-28, wherein the receiver, transmitter, and processor are configured to use an Ro interface to communicate with the OCS.

30. The node as in any one of embodiments 27-29 comprising a machine type communication interworking function.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

What is claimed:

1. A method, implemented by a machine-type communication interworking function (MTC-IWF), for delivering a data payload, the method comprising:
receiving the data payload;
sending a subscriber information request to determine whether a wireless transmit/receive unit (WTRU) is present;
receiving, from a mobility management entity (MME), an identity of a packet data network gateway (P-GW) indicating that the WTRU is present; and
upon receiving the identity of the P-GW from the MME, sending the received data payload to the P-GW over a diameter based $T_{xx}$ interface that is between the MTC-IWF and the P-GW, wherein sending the received data payload enables the P-GW to create an Internet Protocol (IP) packet with an IP address comprising the received data payload and enables the P-GW to deliver the IP packet to the WTRU using the IP address and a default or dedicated bearer of the WTRU.

2. The method of claim 1, further comprising:
on a condition that the WTRU is in idle mode, activating the default bearer and delivering the received data payload to the WTRU.

3. The method of claim 2, wherein the activating of the default bearer comprises using the MME.

4. The method of claim 1, further comprising:
receiving a message confirming that the received data payload has been accepted by the P-GW; and
receiving a delivery report that indicates whether the received data payload has been delivered.

5. The method of claim 1, wherein the IP address is a first IP address, the method further comprising:
using a second IP address of the P-GW to transmit a message that includes a trigger payload to the first IP address of the WTRU and a port number specified by the received data payload.

6. The method of claim 1, wherein the subscriber information request is sent to the MME.

7. The method of claim 1, wherein the identity of the P-GW is received via a subscriber information response.

8. The method of claim 1, wherein the diameter based $T_{xx}$ interface enables one or more triggers to be sent over the user plane.

9. The method of claim 1, wherein the received data payload is a trigger payload.

10. A machine-type communication interworking function (MTC-IWF) in a packet data network, comprising:
a receiver configured to receive a data payload;
a transmitter configured to transmit a subscriber information request to determine whether a wireless transmit/receive unit (WTRU) is present;
the receiver further configured to receive, from a mobility management entity (MME), an identity of a packet data network gateway (P-GW) indicating that the WTRU is present; and
upon receiving the identity of the P-GW, the transmitter further configured to transmit the received data payload to the P-GW over a diameter based $T_{xx}$ interface that is between the MTC-IWF and the P-GW, wherein transmitting the received data payload to the P-GW enables the P-GW to create an Internet Protocol (IP) packet with an IP address comprising the received data payload and enables the P-GW to deliver the IP packet to the WTRU using the IP address and a default or dedicated bearer of the WTRU.

11. The MTC-IWF of claim 10, wherein the receiver is further configured to:
receive a message confirming that the received data payload has been accepted by the P-GW; and
receive a delivery report that indicates whether the received data payload has been delivered.

12. The MTC-IWF of claim 10, wherein the subscriber information request is sent to the MME.

13. The MTC-IWF of claim 10, the transmitter further configured to, on a condition that the WTRU is in idle mode, activate the default bearer and deliver the received data payload to the WTRU.

14. The MTC-IWF of claim 13, wherein activation of the default bearer comprises use of the MME.

15. The MTC-IWF of claim 10, wherein the diameter based $T_{xx}$ interface enables one or more triggers to be sent over the user plane.

16. The MTC-IWF of claim 10, wherein the received data payload is a trigger payload.

17. A machine-type communication interworking function (MTC-IWF) in a packet data network, the MTC-IWF comprising:
    a memory comprising instructions, and
    a processor operatively coupled to the memory, the processor configured to execute the instructions from the memory causing the MTC-IWF to:
    receive a data payload;
    send a subscriber information request to determine whether a wireless transmit/receive unit (WTRU) is present;
    receive, from a mobility management entity (MME), an identity of a packet data network (PDN) gateway (P-GW) indicating that the WTRU is present; and
    in response to the received identity of the P-GW, send the received data payload to the P-GW over a diameter based $T_{xx}$ interface that is between the MTC-IWF and the P-GW, wherein sending the received data payload enables the P-GW to create an Internet Protocol (IP) packet with an IP address comprising the received data payload and enables the PGW to deliver the IP packet to the WTRU using the IP address and a default or dedicated bearer of the WTRU.

18. The MTC-IWF of claim 17, wherein the processor is further configured to execute instructions from the memory causing the MTC-IWF to activate the default bearer and deliver the received data payload to the WTRU when the WTRU is in idle mode.

19. The MTC-IWF of claim 17, wherein the processor is further configured to execute instructions from the memory causing the MTC-IWF to activate the default bearer by using the MME.

20. The MTC-IWF of claim 17, wherein the processor is further configured to execute instructions from the memory causing the MTC-IWF to:
    receive a message confirming that the received data payload has been accepted by the P-GW; and
    receive a delivery report that indicates whether the received data payload has been delivered.

21. The MTC-IWF of claim 17, wherein the IP address is a first IP address, and the processor is further configured to execute instructions from the memory causing the MTC-IWF to use a second IP address of the P-GW to transmit a message that includes a trigger payload to the first IP address of the WTRU and a port number specified by the received data payload.

* * * * *